US010068074B2

(12) United States Patent
Mercury et al.

(10) Patent No.: US 10,068,074 B2
(45) Date of Patent: Sep. 4, 2018

(54) GENERATION, MANAGEMENT, AND TRACKING OF DIGITAL CREDENTIALS

(71) Applicant: Pearson Education, Inc., New York, NY (US)

(72) Inventors: Mark Thomas Mercury, Minneapolis, MN (US); Kurt Jarin Schmidt, Eden Prairie, MN (US)

(73) Assignee: CREDLY, INC., New York, NY (US)

( * ) Notice: Subject to any disclaimer, the term of this patent is extended or adjusted under 35 U.S.C. 154(b) by 87 days.

(21) Appl. No.: 15/081,215

(22) Filed: Mar. 25, 2016

(65) Prior Publication Data

US 2017/0277872 A1 Sep. 28, 2017

(51) Int. Cl.
*G06F 21/31* (2013.01)
*G06F 21/45* (2013.01)

(52) U.S. Cl.
CPC .............. *G06F 21/31* (2013.01); *G06F 21/45* (2013.01)

(58) Field of Classification Search
CPC ........ G06F 21/00; G06F 21/10; G06F 21/105; G06F 21/30; G06F 21/31; G06F 21/33; G06F 21/36; G06F 21/45; G06F 21/60; G06F 21/62
See application file for complete search history.

(56) References Cited

U.S. PATENT DOCUMENTS

| | | |
|---|---|---|
| 5,748,738 A | 5/1998 | Bisbee et al. |
| 5,781,732 A | 7/1998 | Adams |
| 5,963,649 A | 10/1999 | Sako |
| 6,389,402 B1 | 5/2002 | Ginter et al. |
| 6,516,411 B2 | 2/2003 | Smith |

(Continued)

FOREIGN PATENT DOCUMENTS

WO 2008/030759 A1 3/2008

OTHER PUBLICATIONS

Chamilo/Chamilo-IMS, "Get badges when the user has achieved skills—ref BT#9082", Feb. 12, 2015, downloaded from https://github.com/chamilo/chamilo-lms/commit/15d7e22521aa752f9a96840ae57d493250533671 on Feb. 16, 2018, 2 pages.

(Continued)

*Primary Examiner* — Eric W Shepperd
(74) *Attorney, Agent, or Firm* — Kilpatrick Townsend & Stockton LLP

(57) ABSTRACT

Techniques described herein relate to generating and managing digital credentials using a digital credential platform in communication with various digital credential template owners and digital credential issuers. In some embodiments, a digital credential platform server may receive and coordinate requests and responses between the digital credential template owners and a set of digital credential issuers, to determine which digital credential issuers are authorized to issue digital credential based on which digital credential templates. The digital credential platform server may provide the authorized issuers with access to particular digital credential templates and the functionality to issue digital credentials to users based on any of the particular digital credential templates. Additional techniques described herein relate to tracking, analyzing, and reporting data metrics for issued digital credentials.

20 Claims, 16 Drawing Sheets

(56) References Cited

U.S. PATENT DOCUMENTS

| | | |
|---|---|---|
| 6,659,038 B2 | 12/2003 | Salva Calcagno |
| 6,948,657 B2 | 9/2005 | Sugino et al. |
| 6,973,196 B2 | 12/2005 | Patton et al. |
| 6,988,199 B2 | 1/2006 | Toh et al. |
| 7,043,453 B2 | 5/2006 | Stefik et al. |
| 7,089,583 B2 | 8/2006 | Mehra et al. |
| 7,099,849 B1 | 8/2006 | Reeder et al. |
| 7,133,845 B1 | 11/2006 | Ginter et al. |
| 7,188,138 B1 | 3/2007 | Schneider et al. |
| 7,197,161 B2 | 3/2007 | Fan |
| 7,206,765 B2 | 4/2007 | Gilliam et al. |
| 7,206,941 B2 | 4/2007 | Raley et al. |
| 7,237,114 B1 | 6/2007 | Rosenberg |
| 7,237,144 B2 | 6/2007 | Safford et al. |
| 7,277,925 B2 | 10/2007 | Warnock |
| 7,278,168 B1 | 10/2007 | Chaudhury et al. |
| 7,302,634 B2 | 11/2007 | Lucovsky et al. |
| 7,328,245 B1 | 2/2008 | Hull et al. |
| 7,340,058 B2 | 3/2008 | Jakobsson et al. |
| 7,353,541 B1 | 4/2008 | Ishibashi et al. |
| 7,392,395 B2 | 6/2008 | Ginter et al. |
| 7,587,369 B2 | 9/2009 | Ginter et al. |
| 7,596,689 B2 | 9/2009 | Toh et al. |
| 7,660,902 B2 | 2/2010 | Graham et al. |
| 7,660,981 B1 | 2/2010 | Hunt |
| 7,665,141 B2 | 2/2010 | Young |
| 7,676,568 B2 | 3/2010 | Day |
| 7,725,723 B2 | 5/2010 | Landrock et al. |
| 7,743,259 B2 | 6/2010 | Raley et al. |
| 7,769,712 B2 | 8/2010 | Waldo et al. |
| 7,793,106 B2 | 9/2010 | Bugbee |
| 8,051,289 B2 | 11/2011 | Johnson et al. |
| 8,103,634 B2 | 1/2012 | Saito |
| 9,112,730 B2 | 8/2015 | Dewaele et al. |
| 9,373,002 B2 | 6/2016 | Johnson et al. |
| 9,589,183 B2 | 3/2017 | Brown |
| 9,729,411 B2 | 8/2017 | Purusothaman |
| 9,729,556 B2 | 8/2017 | Brock |
| 2001/0047326 A1* | 11/2001 | Broadbent ............. G06Q 10/10 705/38 |
| 2002/0023140 A1 | 2/2002 | Hile et al. |
| 2002/0026574 A1* | 2/2002 | Watanabe ................ G06F 21/10 713/155 |
| 2002/0026581 A1* | 2/2002 | Matsuyama ............ G06F 21/10 713/168 |
| 2002/0037094 A1 | 3/2002 | Calcagno |
| 2002/0052896 A1 | 5/2002 | Streit et al. |
| 2002/0087861 A1 | 7/2002 | Segev et al. |
| 2002/0095389 A1 | 7/2002 | Gaines |
| 2002/0128844 A1 | 9/2002 | Wilson et al. |
| 2002/0143818 A1 | 10/2002 | Roberts et al. |
| 2002/0157015 A1 | 10/2002 | Gilbert |
| 2003/0028494 A1 | 2/2003 | King et al. |
| 2003/0070072 A1 | 4/2003 | Nassiri |
| 2003/0182234 A1 | 9/2003 | Degroot |
| 2003/0187798 A1 | 10/2003 | McKinley et al. |
| 2003/0191653 A1* | 10/2003 | Birnbaum ............. G06Q 30/02 705/1.1 |
| 2003/0233563 A1 | 12/2003 | Kruse |
| 2004/0039704 A1 | 2/2004 | Gilliam et al. |
| 2004/0054893 A1 | 3/2004 | Ellis |
| 2004/0123111 A1 | 6/2004 | Makita et al. |
| 2004/0133793 A1 | 7/2004 | Ginter et al. |
| 2004/0220815 A1 | 11/2004 | Belanger et al. |
| 2004/0237035 A1 | 11/2004 | Cummins |
| 2005/0027558 A1* | 2/2005 | Yamamoto ......... G06Q 10/0637 705/17 |
| 2005/0027568 A1 | 2/2005 | Dorris |
| 2005/0080682 A1 | 4/2005 | Wilson |
| 2005/0182821 A1 | 8/2005 | Chan et al. |
| 2005/0229258 A1 | 10/2005 | Pigin |
| 2005/0257253 A1 | 11/2005 | Ekers |
| 2005/0262339 A1 | 11/2005 | Fischer |
| 2005/0288939 A1 | 12/2005 | Peled et al. |
| 2006/0039304 A1 | 2/2006 | Singer et al. |
| 2006/0095831 A1 | 5/2006 | Kawada et al. |
| 2006/0180658 A1 | 8/2006 | Anderson |
| 2006/0282661 A1 | 12/2006 | True et al. |
| 2007/0006322 A1 | 1/2007 | Karimzadeh et al. |
| 2007/0038859 A1 | 2/2007 | Tadayon et al. |
| 2007/0074270 A1 | 3/2007 | Meehan et al. |
| 2007/0118735 A1 | 5/2007 | Cherrington et al. |
| 2007/0124584 A1 | 5/2007 | Gupta |
| 2007/0192140 A1 | 8/2007 | Gropper |
| 2007/0192609 A1 | 8/2007 | Yoshioka et al. |
| 2007/0220614 A1 | 9/2007 | Ellis et al. |
| 2007/0226488 A1 | 9/2007 | Lin et al. |
| 2007/0289022 A1 | 12/2007 | Wittkotter |
| 2008/0005024 A1 | 1/2008 | Kirkwood |
| 2008/0066181 A1 | 3/2008 | Haveson et al. |
| 2008/0091954 A1 | 4/2008 | Morris et al. |
| 2008/0106756 A1* | 5/2008 | Okamoto ........... G03G 15/6582 358/1.15 |
| 2008/0208873 A1 | 8/2008 | Boehmer |
| 2008/0235175 A1 | 9/2008 | Olive |
| 2008/0235236 A1 | 9/2008 | Olive |
| 2009/0172777 A1 | 7/2009 | Hansen et al. |
| 2010/0033739 A1 | 2/2010 | Phelan |
| 2010/0106645 A1 | 4/2010 | Peckover |
| 2010/0122093 A1 | 5/2010 | Tuyls et al. |
| 2010/0150448 A1 | 6/2010 | Lecerf et al. |
| 2010/0205649 A1 | 8/2010 | Becker |
| 2010/0217988 A1 | 8/2010 | Johnson |
| 2011/0022496 A1† | 1/2011 | Johnson |
| 2011/0320423 A1* | 12/2011 | Gemmell .......... G06F 17/30867 707/706 |
| 2013/0086484 A1 | 4/2013 | Antin et al. |
| 2013/0097093 A1 | 4/2013 | Kolber et al. |
| 2013/0117400 A1* | 5/2013 | An ...................... H04L 63/0823 709/206 |
| 2013/0340058 A1* | 12/2013 | Barnes ..................... G06F 21/32 726/6 |
| 2014/0006615 A1 | 1/2014 | Karnik et al. |
| 2014/0173748 A1* | 6/2014 | Esmailzdeh .......... G06F 3/0689 726/27 |
| 2014/0279587 A1* | 9/2014 | Gafford ................. G06Q 50/18 705/311 |
| 2014/0304181 A1 | 10/2014 | Kurien et al. |
| 2014/0348396 A1 | 11/2014 | Laaser et al. |
| 2014/0353369 A1 | 12/2014 | Malin et al. |
| 2014/0369602 A1 | 12/2014 | Meier et al. |
| 2015/0059003 A1 | 2/2015 | Bouse |
| 2015/0066612 A1 | 3/2015 | Karpoff et al. |
| 2015/0229623 A1* | 8/2015 | Grigg ..................... H04L 63/08 726/7 |
| 2016/0267292 A1 | 9/2016 | Johnson et al. |
| 2017/0132464 A1 | 5/2017 | Brown |
| 2017/0279614 A1 | 9/2017 | Mercury et al. |

OTHER PUBLICATIONS

The Mozilla Foundation and Peer 2 Peer University, in collaboration with The MacArthur Foundation, "Open Badges for Life Long Learning", Jan. 23, 2012, 14 pages.

Smith; Sue, et al., "API Endpoints" retrieved from https://github.com/mozilla/badgekit-api/blob/master/docs/api-endpoints.md, Jul. 31, 2014, 4 pages.

Smith; Sue, "Badgekit API Documentation", retrieved from https://github.com/mozilla/badgekitapi/blob/master/docs/README.md, Jun. 13, 2014, 2 pages.

Smith; Sue, "Assessment", retrieved from https://github.com/mozilla/badgekit-api/blob/master/docs/assessment.md, Jun. 18, 2014, 19 pages.

Brianloveswords, "Authorization" retrieved from https://github.com/mozilla/badgekit-api/blob/master/docs/authorization.md, Mar. 3, 2014, 2 pages.

Smith; Sue, et al., "Badges" retrieved from https://github.com/mozilla/badgekit-api/blob/master/docs/badges.md, Jul. 31, 2014, 20 pages.

(56) References Cited

OTHER PUBLICATIONS

Smith; Sue, et al., "Claim Codes", retrieved from https://github.com/mozilla/badgekit-api/blob/master/docs/claim-codes.md, Jun. 18, 2014, 11 pages.
Smith; Sue, et al., "Issuers", retrieved from https://github.com/mozilla/badgekit-api/blob/master/docs/issuers.md, Jun. 16, 2014, 9 pages.
Smith; Sue, "Issuing", retrieved from https://github.com/mozilla/badgekit-api/blob/master/docs/issuing.md, Jun. 24, 2014, 7 pages.
Smith; Sue, et al., "Milestones", retrieved from https://github.com/mozilla/badgekit-api/blob/master/docs/milestones.md, Jun. 16, 2014, 15 pages.
Smith; Sue, et al., "Programs" retrieved from https://github.com/mozilla/badgekit-api/blob/master/docs/programs.md, Jun. 16, 2014, 8 pages.
Smith; Sue, et al., "Systems" retrieved from https://github.com/mozilla/badgekit-api/blob/master/docs/systems.md, Jun. 16, 2014, 9 pages.
Smith; Sue, et al., "SystemCallbacks (Webhooks)", retrieved from https://github.com/mozilla/badgekit-api/blob/master/docs/webhooks.md, Jun. 13, 2014, 4 pages.
Alicoding et al, "BadgeKit API", retrieved from https://github.com/mozilla/badgekit-api, Aug. 25, 2015, 3 pages.
Mozilla, Open Badges Backpack-ng (Next Generation), Jun. 2012, https://github.com/mozilla/openbadges-backpack, retrieved Nov. 28, 2017, pp. 1-5.
The Mozilla Foundation and Peer 2 Peer University in Collaboration With the MacArthur Foundation, "Open Badges for Lifelong Learning", updated Aug. 27, 2012, pp. 1-14.
Lester, Dave "Assertion Specification Changes", Mozilla/openbadges-backpack, , last edited Apr. 16, 2013, 1 revision, https://github.com/mozilla/opengadges-backpack/wiki/Assertion-Specification-Changes, retrieved Nov. 28, 2017, pp. 1-3.
The Badge Alliance Standard Working Group "Open Badges Technical Specification", published May 1, 2015, http://web.archive.org/web/20160426204303 /https://openbadgespec.org/ retrieved Nov. 28, 2017, pp. 1-9.
Otto, Nate; Gylling, Markus, Editors, "Open Badges v2.0 IMS Candidate Final / Public Draft", IMS Global Learning Consortium, Mar. 8, 2017, htpp://www.imsglobal.org/Badges/OBv2p0/index.html, retrieved Nov. 28, 2017, pp. 1-17.
Mozilla, Lrng, IMS Global Learning Consortium, "What's an Open Badge?", https://opengadebs.ort/get-started/, retrieved Nov. 28, 2017, all pages.
Mozilla, Lrng, IMS Global Learning Consortium, "Developers Guide", copyright 2016, http://opengadges.org/developers/, retrieved Nov. 28, 2017, pp. 1-12.
Thompson, Matt, "Introducing Open Badges 1.0", The Mozilla Blog, Mar. 14, 2013 https://blog.mozilla.org/blog/2013/03/14/open_badges/, retrieved Nov. 29, 2017 pp. 1-11.
Grant, Sheryl, "What Counts As Learning, Open Digital Badges for New Opportunities", The digital Media + Learning Research Hub Report Series on Connected Learning, ISBN-13:978-0-9887255-3-9, published by the Digital Media and Learning Research Hub, Aug. 2014, pp. 1-57.
Pearson, "Open badges are unlocking the emerging jobs economy", 2013, pp. 1-7.
Open Badges Specification, v1.1, Jan. 5, 2015, retrieved on Dec. 4, 2017, retrieved from the Internet <URL: https://openbadgespec.org/history/1.1-specification.html >, entire document.
White Paper—Open Badges are Unlocking the Emerging Jobs Economy, Dec. 31, 2013, retrieved on Apr. 13, 2017, retrieved from the Internet <URL: https://www.pearsoned.com/wp-content/uploads/openbadges_unlockjobs.pdf >, entire document.

\* cited by examiner
† cited by third party

Analytics › Custom

Select the metrics for your report:

Date Range
- ● All
- ○ Past month
- ○ Past 6 months
- ○ Past 12 months
- ○ Custom Credential States
- ☐ Pending
- ☑ Accepted
- ☐ Rejected
- ☐ Revoked Expired Credentials
- ● Include expired and unexpired
- ○ Include unexpired only
- ○ Include expired only

[Next]

GENERATION, MANAGEMENT, AND TRACKING OF DIGITAL CREDENTIALS

BACKGROUND

Continued changes in computing technologies have provided individuals with additional options for obtaining and validating technical skills and proficiencies. Rather than attending traditional educational institutions and professional training courses, many individual now obtain their technical skills and proficiencies from alternative sources, such as structured or unstructured and asynchronous eLearning programs using distance learning technology, self-study research without any direct supervision, or various alternative technical learning, training, and testing entities. Although such advances in technologies and increasing globalization trends provide many more options for individuals to obtain technical skills and proficiencies, they also present challenges in publishing, verifying, and tracking the sets of technical skills and proficiencies that these individuals have obtained. Many individuals and institutions no longer rely on physical certificates such as diplomas, transcripts, certification statements, and physical licenses, to verify the authenticity of an individual's proficiencies or qualifications. Instead, certain institutions may issue digital credentials (or digital badges) to qualifying individuals, and these digital credential earners may use the digital credentials to certify the skills or qualifications that the earner obtained vis-à-vis the institution.

BRIEF SUMMARY

Various techniques are described herein for generating and managing digital credentials using a digital credential platform in communication with various digital credential template owners and digital credential issuers. In some embodiments, one or more digital credential templates may be received by a digital credential platform server, from various template owner systems. Template owners may correspond to entities responsible for controlling the content and definition of a digital credential, such as an educational institution or other professional training organization. The digital credential platform server also receives and coordinates requests and responses between the digital credential template owners and a set of digital credential issuers, to determine which digital credential issuers are authorized to issue digital credential based on which digital credential templates. After receiving authorization data from a template owner permitting a particular digital credential issuer to issue digital credentials based on one or more particular digital credential templates, the digital credential platform server may provide the authorized issuers with access to the particular digital credential templates and the functionality to generate (or issue) new digital credentials to users based on any of the particular digital credential templates. After issuance of a new digital credential by an authorized issuer, the digital credential platform server may store the digital credential and initiate communication with the associated template owner and/or the digital credential receiver. Thus, in various embodiments described herein, digital credentials issued via a digital credential platform server may be associated with one or more separate providers, issuers, and/or receivers, as well as one or more credential endorsers. After the issuance of a digital credential, the digital credential platform server may further verify, track, and update digital credentials based on additional data received from one or more of these various entities.

Additional techniques described herein relate to tracking, analyzing, and reporting data metrics for issued digital credentials. In certain embodiments, one or more digital credential templates may be received by a digital credential platform server, from various template owner systems. The digital credential platform server may store the digital credential templates, as well as data corresponding to any issued digital credentials based on the templates. Following the issuance of digital credentials, the digital credential platform server may initiate and/or receive interactions with digital credential receivers, digital credential template owners, digital credential issuers, and various additional systems, relating to the issued digital credentials. For example, digital credential platform server may provide functionality for receivers to accept or reject digital credentials, and shared digital credentials via various communication media and platforms. The digital credential platform server also may receive and track digital credential views by various external systems. In responses to a request for data metrics and/or analysis from a client device, the digital credential platform server may determine a subset of digital credentials associated with the request, and then transmit data relating to the subset of digital credentials, including data metrics such as the issue date, status, and expiration date of the digital credentials, the issuing and providing entities, and metrics relating to acceptances, shares, views, etc.

BRIEF DESCRIPTION OF THE DRAWINGS

FIGS. 14A and 14B are example user interface screens generated by a digital credential platform server to display a digital credential search interface, according to one or more embodiments of the disclosure.

Figure 1:
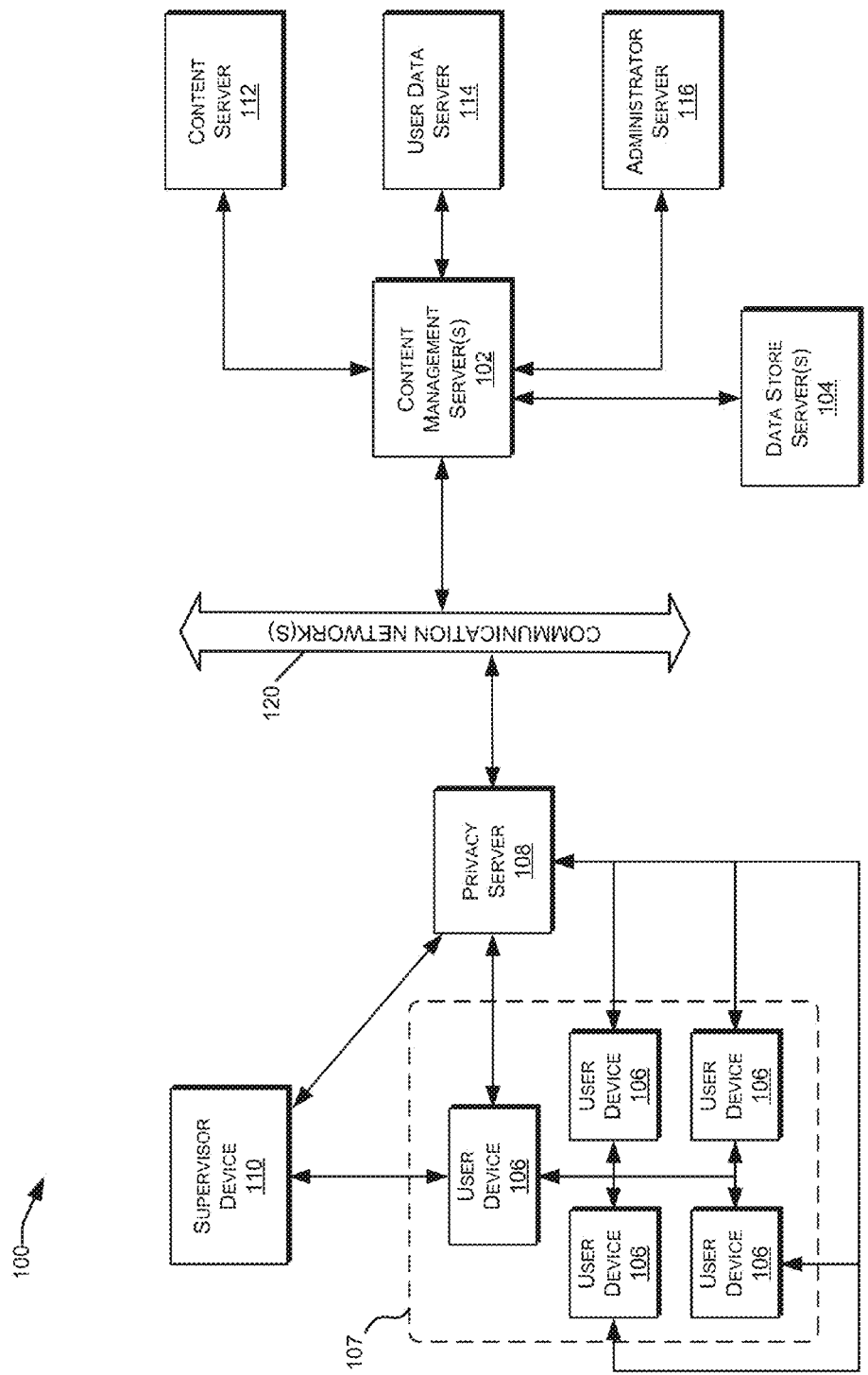
FIG. 1 is a block diagram showing illustrating an example of a content distribution network.

In the appended figures, similar components and/or features may have the same reference label. Further, various compo of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory machine-readable storage medium, etc.) are described herein for generating and managing digital credentials using a digital credential platform in communication with various digital credential template owners and digital credential issuers. In some embodiments, one or more digital credential templates may be received by a digital credential platform server, from various template owner systems. Template owners may correspond to entities responsible for controlling the content and definition of a digital credential, such as an educational institution or other professional training organization. The digital credential platform server also receive and coordinate requests and responses between the digital credential template owners and a set of digital credential issuers, to determine which digital credential issuers are authorized to issue digital credential based on which digital credential templates. After receiving authorization data from a template owner permitting a particular digital credential issuer to issue digital credentials based on one or more particular digital credential templates, the digital credential platform server may provide the authorized issuers with access to the particular digital credential templates and the functionality to generate (or issue) new digital credentials to users based on any of the particular digital credential templates. After issuance of a new digital credential by an authorized issuer, the digital credential platform server may store the digital credential and initiate communication with the associated template owner and/or the digital credential receiver. This, in various embodiments described herein, digital credentials issued via a digital credential platform server may be associated with one or more separate providers, issuers, and/or receivers, as well as one or more credential endorsers. After the issuance of a digital credential, the digital credential platform server may further verify, track, and update digital credentials based on additional data received from one or more of these various entities.

Additional techniques described herein relate to tracking, analyzing, and reporting data metrics for issued digital credentials. In certain embodiments, one or more digital credential templates may be received by a digital credential platform server, from various template owner systems. The digital credential platform server may store the digital credential templates, as well as data corresponding to any issued digital credentials based on the templates. Following the issuance of digital credentials, the digital credential platform server may initiate and/or receive interactions with digital credential receivers, digital credential template owners, digital credential issuers, and various additional systems, relating to the issued digital credentials. For example, digital credential platform server may provide functionality for receivers to accept or reject digital credentials, and shared digital credentials via various communication media and platforms. The digital credential platform server also may receive and track digital credential views by various external systems. In responses to a request for data metrics and/or analysis from a client device, the digital credential platform server may determine a subset of digital credentials associated with the request, and then transmit data relating to the subset of digital credentials, including data metrics such as the issue date, status, and expiration date of the digital credentials, the issuing and providing entities, and metrics relating to acceptances, shares, views, etc.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
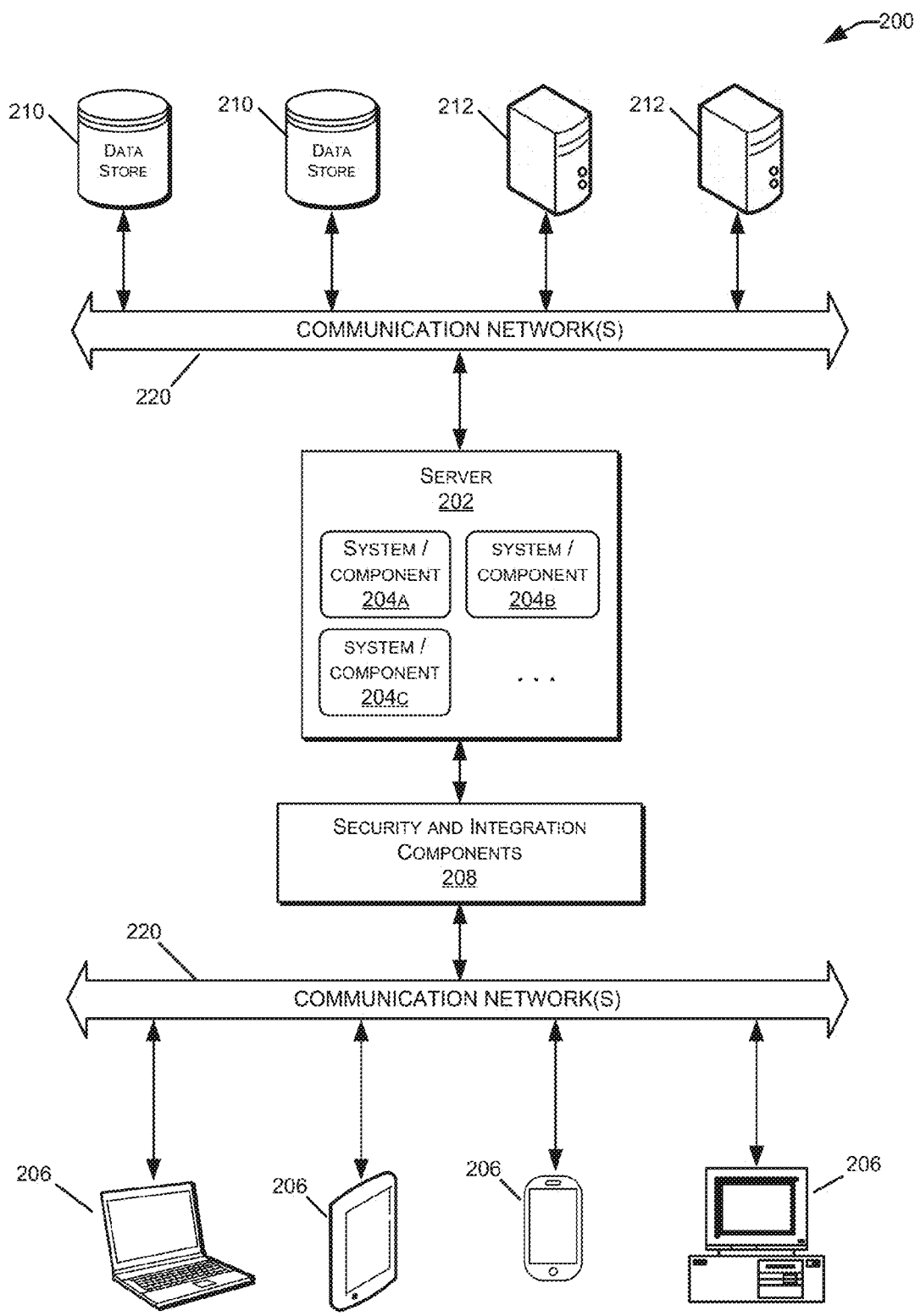
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
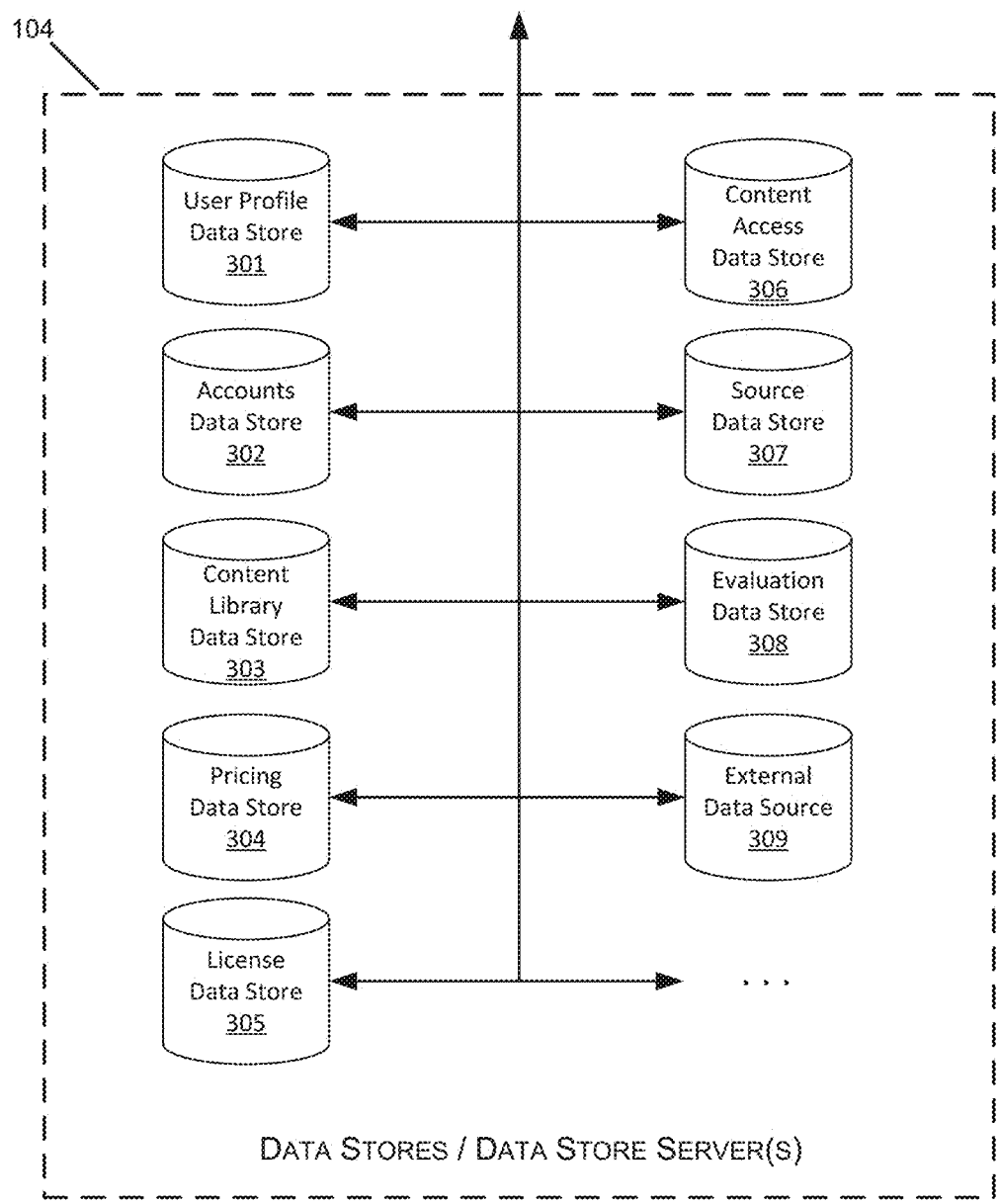
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. A data store's server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
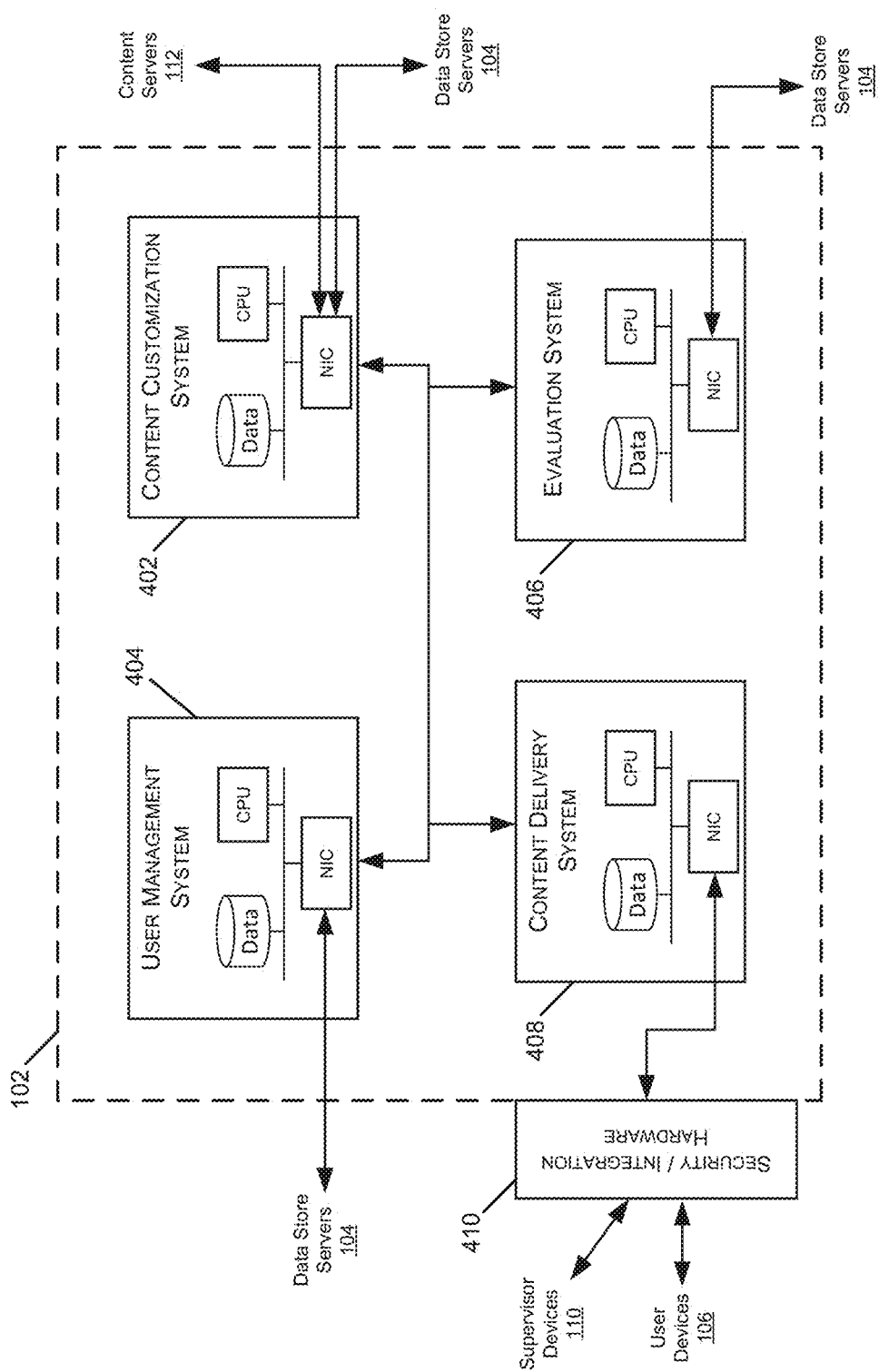
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
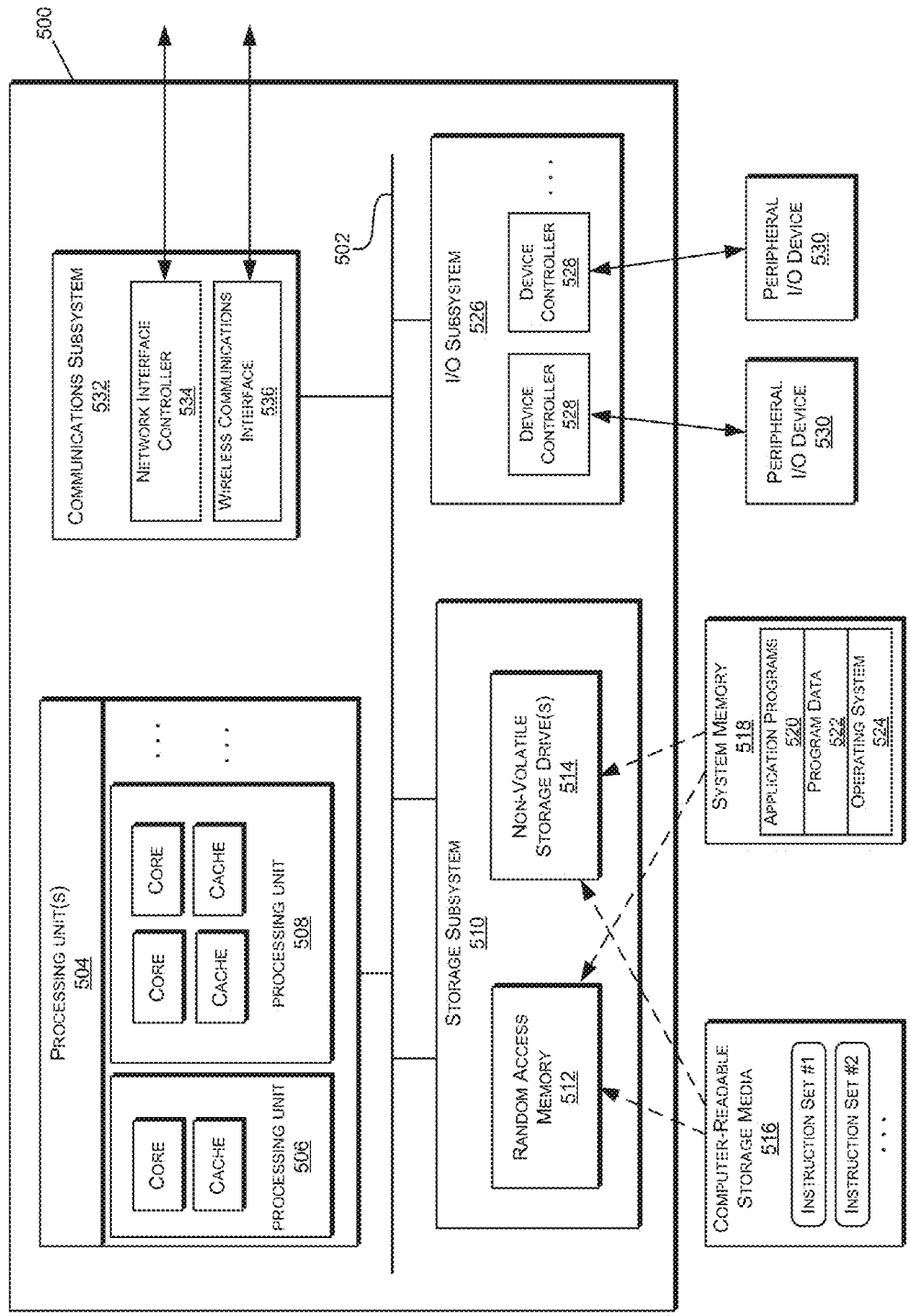
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 510 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
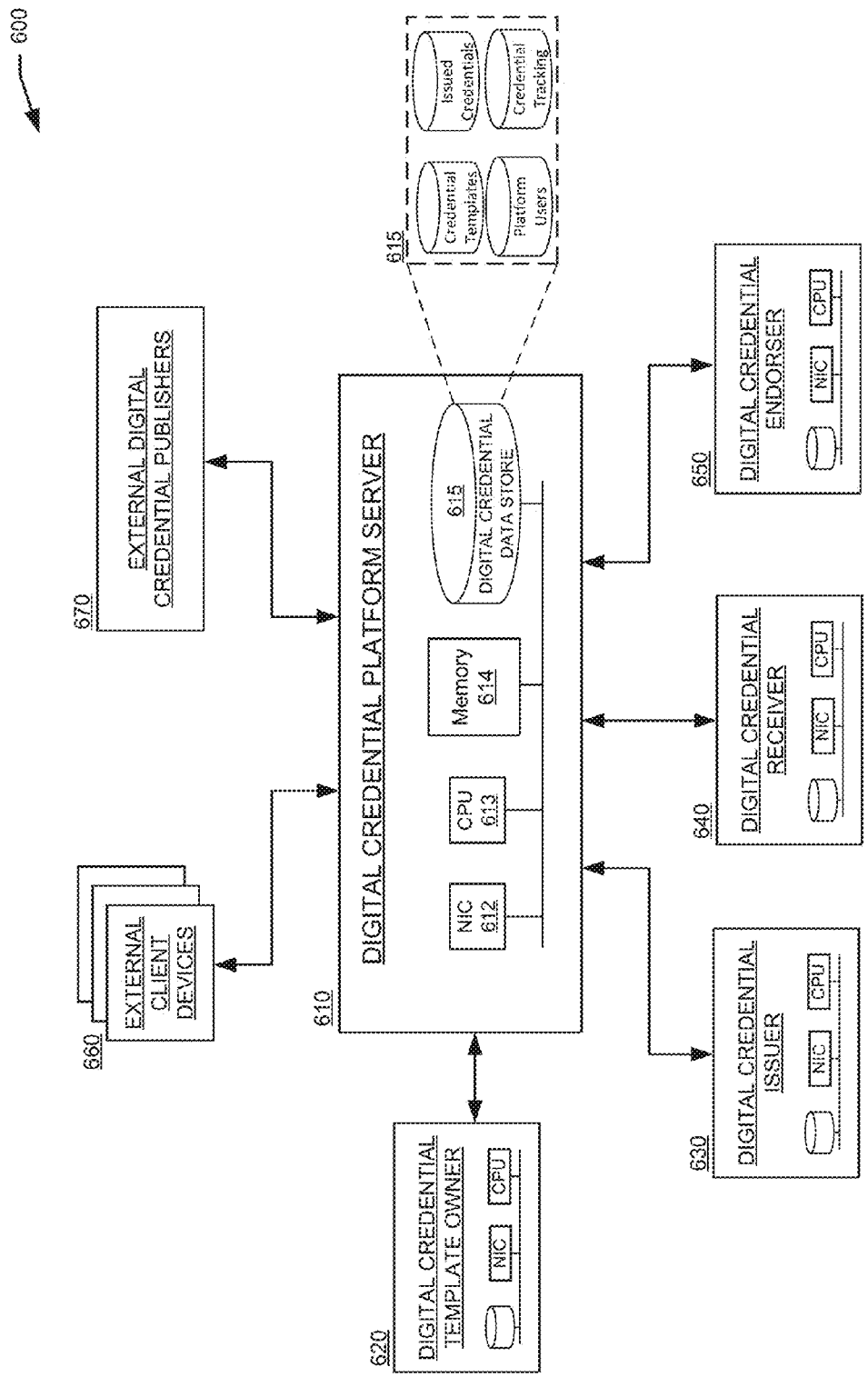
FIG. 6 is a block diagram illustrating an example system for generating, managing, and tracking digital credential templates and digital credentials, according to one or more embodiments of the disclosure.

With reference now to FIG. 6, a block diagram is shown illustrating an example of a digital credential management system 600 for generating, managing, and tracking digital credential templates and digital credentials. As shown in this example, a digital credential management system 600 may include a digital credential platform server 610 configured to communicate with various other digital credential systems 620-670. As discussed below, the digital credential platform server 610 (or platform server 610) may receive and store digital credential templates from various digital credential template owner systems 620. Systems 620 may correspond to the computer servers and/or devices of an educational institution or other professional training organization, which has the primary responsibility for defining a digital credential template and controlling the content and requirements for users to receive a digital credential from the organization. The digital credential management system 600 may include one or more digital credential issuer systems 630. As discussed below, each issuer system 630 may communicate with the platform server to request and receive access to issue digital credentials based on specific digital credential templates. The platform server 610 may process template access requests from the credential issuer systems 630, permitting or denying a specific system 630 to generate (or issue) a digital credential based on a specific digital credential template.

As used herein, a digital credential template (or digital badge template) may refer to an electronic document or data structure storing a general (e.g., non-user specific) template or description of a specific type of digital credential that may be issued to an individual. Digital credential templates may include, for example, a description of the skills, proficiencies, and/or achievements that the digital credential represents. This description may take the form of diploma data, certification data, and/or license data, including the parent organization (i.e., the digital credential template owner) responsible for creating and defining the digital credential template. Examples of digital credential templates include templates for various technology certifications, licensure exams, professional tests, training course completion certificates, and the like. In contrast to a digital credential template, a digital credential (or digital badge) may refer to an instance of an electronic document or data structure, generated for a specific individual (i.e., the credential receiver), and based on a digital credential template. Thus, a digital credential document or data structure may be based on a corresponding digital credential template, but may be customized and populated with user-specific information such as individual identification data (e.g., name, email address, and other user identifiers), credential issuance data (e.g., issue date, geographic location of issuance, authorized issuer of the credential, etc.), and links or embedded data that contain the specific user's supporting documentation or evidence relating to the credential.

As shown in this example, the system 600 also may include a digital credential receiver system 640 and a digital credential endorser system 650. The digital credential receiver system 640 may be a computing device associated with a credential receiver (or credential earner), for example, an individual user of an electronic learning system, professional training system, online certification course, etc. As discussed below, credential receivers may access the platform server 610 via systems 640 to accept or reject newly issued digital credentials, review and update their own set of previously earned digital credentials, as well as to publish (or share) their digital credentials via communication applications or publishing platforms such as social media systems. Digital credential endorser system 650 may be a computing system associated with an endorsing entity, such as an educational institution, business, or technical organization that has chosen to review and endorse a specific digital credential template. The platform server 610 may receive and track the endorsements received from systems 650, and may associate the endorsements with the user-specific digital credentials issued based on the endorsed templates. The platform server 610 may provide graphical and/or programmatic interfaces to support interactions with different endorser systems 650.

In some cases, credential endorsers may initiate an interaction with the platform server 610, which may allow the credential endorsers to browse, review, and select one or more templates to endorse. In these cases, the platform server 610 may identify the template owners of the selected templates, and transmit requests to the corresponding owner systems 610 to confirm the endorsements. Template owner systems 610 may respond by accepting the endorsement, in which case the template data is updated within the data store 615, or rejecting the endorsement, in which case the stored template data is not updated. Additionally or alternatively, template owners and/or authorized issuers may initiate the interactions by making requests for endorsements from specific endorsers. In these cases, the platform server 610 may support interfaces that allow template owners and/or authorized issuers to select one or more of their associated templates, and then browse and select from a list of registered endorsers to send endorsement requests. In response, the platform server 610 may identify the endorser systems 650 of the selected endorsers and transmit endorsement requests. The endorser systems 650 of the selected endorsers may respond by agreeing to the endorse the template, in which case the template data is updated within the data store 615, or refusing to endorse, in which case the stored template data is not updated.

Although these examples describe endorsements of templates, the same techniques may be used to request, receive, and track endorsements of specific authorized issuers and/or endorsements of certain template-issuer combinations. For example, an endorser via an endorser system 650 may initiate or respond to communications from the platform server 610 to provide an endorsement of all digital credentials issued by a particular authorized issuer, regardless of the template. In other examples, an endorser may interact with the interfaces of the platform server 610 to provide an endorsement for all of the digital credentials issued by a particular authorized issuer based on a particular template, whereas the same endorser might not endorse other credentials issued by other authorized issuers based on the same particular template.

Additionally, the platform server 610 also may allow endorser systems 650 to endorse various templates (and/or template-issuer combinations) with an endorsement amount representing an endorsement value or strength. For instance, an endorsing entity such as an occupational certification organization may wish to endorse a certain credential template, indicating in the endorsement that the corresponding digital credentials count towards N number of certification credits or points. As another example, an endorsing entity may endorse a first template-issuer combination with a first endorsement level (e.g., Regular Endorsement), and a second template-issuer combination with a first endorsement level (e.g., Highest Endorsement). In these examples, the platform server 610 may support the interactions with the endorser systems 650, allowing endorsers to select templates, issuers, and templates-issuer combinations to endorse, as well as select endorsement levels/values/strengths for each endorsement. The platform server 610 may save the endorsement data in the appropriate tables of data store 615, and may retrieve and apply the endorsement when providing digital credential data/views.

Additionally, the digital credential management system 600 in this example includes a number of external client devices 660 and external digital credential publishers 670. External client devices 660 may correspond to computing systems of third-party users that may interact with the platform server 610 to initiate various functionality or retrieve data relating to templates and/digital credentials managed by the platform 610. For example, a client device 660 may query the platform server 610 for data metrics and/or analyses relating to a subset of digital credentials stored in the digital credential data store 615. The third-party systems 660 also may provide data to the platform server 610 that may initiate updates to the templates and/digital credentials stored in the data store 615. External digital credential publishers 670 may correspond to third-party systems configured to receive digital credential data from the platform 610 and publish (or present) the digital credential data to users. Examples of publishers 670 may include social media web site and systems, digital badge wallets, and/or other specialized servers or applications configured to store and present views of digital badges to users.

In various embodiments described herein, the generation and management of digital credentials, as well as the tracking and reporting of digital credential data, may be performed within CDNs 100, such as eLearning, professional training, and certification systems 100. For example, within the context of an eLearning CDN 100, a content management server 102 or other CDN server (e.g., 104, 112, 114, or 116) may create and store digital credential templates to describe and define various proficiencies, achievements, or certifications supported by the eLearning CDN 100. Additionally or alternatively, the content management server 102 or other servers of an eLearning CDN 100 may issue digital credentials to users, based on its own digital credential templates and/or templates received from other systems or CDNs. Further, in some implementations, an eLearning CDN 100 may be configured to include a digital credential platform server 610 to store and manage templates and digital credentials between separate systems within the CDN 100. Thus, in various different implementations, the content management server(s) 102 of a CDN 100 may incorporate one, two, or all three of a digital credential template owner system 620, a digital credential issuer system 630, and/or a digital credential platform server 610. In such embodiments, the various components and functionalities described herein for the platform server 610, owner system 620, and/or issuer system 630 all may be implemented within one or more content management servers 102 (and/or other servers) of an eLearning or professional training CDN 100. In other examples, a digital credential platform server 610 may be implemented using one or more computer servers, and other specialized hardware and software components, separately from any other CDN components such as content servers 112, content management servers 102, data store servers 104, and the like. In these examples, the digital credential platform server 610 may be configured to communicate directly with related systems 620-670, or indirectly through content management servers 102 and/or other components and communications networks of the CDN 100.

In order to perform these features and other functionality described herein, each of the components and sub-components discussed in the example digital credential management system 600 may correspond to a single computer server or a complex computing system including a combination of computing devices, storage devices, network components, etc. Each of these components and their respective subcomponents may be implemented in hardware, software, or a combination thereof. Certain systems 620-670 may communicate directly with the platform server 610, while other systems 620-670 may communicate with the platform server 610 indirectly via one or more intermediary network components (e.g., routers, gateways, firewalls, etc.) or other devices (e.g., content management servers 102, content servers 112, etc.). Although the different communication networks and physical network components have not been shown in this example so as not to obscure the other elements depicted in the figure, it should be understood that any of the network hardware components and network architecture designs may be implemented in various embodiments to support communication between the systems, servers, and devices in the digital credential management system 600. Additionally, different systems 620-670 may use different networks and networks types to communicate with the platform server 610, including one or more telecommunications networks, cable networks, satellite networks, cellular networks and other wireless networks, and computer-based IP networks, and the like. Further, certain components within the digital credential management system 600 may include special purpose hardware devices and/or special purpose software, such as those included in an I/O subsystem and memory 614 of the platform server 610, as well as those within the memory of the other systems 620-670, and the digital credential data store 615 maintained by the platform server 610, discussed below.

Although the various interactions between the platform server 610 and other systems 620-670 may be described below in terms of a client-server model, it should be understood that other computing environments and various combinations of servers and devices may be used to perform the functionality described herein in other embodiments. For instance, although the requests/responses to determine the authorized issuers 630 for specific digital credential templates, the generation of digital credentials, and the retrieval and presentation of digital credential tracking and reporting data, may be performed by a centralized web-based platform server 610 in collaboration with various client applications at the other systems 620-670 (e.g., web browser applications or standalone client software), in other cases these techniques may be performed entirely by a specialized digital credential platform server 610, or entirely by one or more digital credential tools (e.g., software services) executing on any one of the systems 620-670. In other examples, a client-server model may be used as shown in system 600, but different functional components and processing tasks may be allocated to the client-side or the sever-side in different embodiments. Additionally, the digital credential data store 615 may be implemented as separate servers or storage systems in some cases, and may use independent hardware and software service components. However, in other implementations, some or all of the digital credential data store 615 may be incorporated into the platform server 610 (as shown in this example) and/or may be incorporated into various other systems 620-670.

In some embodiments, each of the systems 620-670 that collaborate and communicate with the platform server 610 may be implemented as client computing systems, such desktop or laptop computers, smartphones, tablet computers, and other various types of computing devices, each of which may include some or all of the hardware, software, and networking components discussed above. Specifically, any of client systems 620-670 may be implemented using any computing device with sufficient processing components, memory and software components, and I/O system components for interacting with users and supporting the desired set of communications with the platform server 610, as described herein. Accordingly, client systems 620-670 may include the necessary hardware and software components to establish the network interfaces, security and authentication capabilities, and capabilities for transmitting/receiving digital credential templates and digital credentials, digital credential data requests/responses to the platform server 610, etc. Each client system 620-670 may include an I/O subsystem, network interface controller, a processing unit, and memory configured to operate client software applications. The digital credential platform server 610 may be configured to receive and execute various programmatic and graphical interfaces for generating, managing, and tracking issued digital credentials, in collaboration with the various client systems 620-670. Accordingly, each client systems 620-670 may include an I/O subsystem 611 having hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different client systems 620-670 may support different input and output capabilities within their I/O subsystems, and thus different types of user interactions, and platform server 610 functionality may be compatible or incompatible with certain client systems 620-670. For example, certain types of digital credential generation and search functionality may require specific types of processors, graphics components, network components, or I/O components in order to be optimally designed and constructed using a client system 620-670.

In some embodiments, the digital credential platform server 610 may generate and provide software interfaces (e.g., via a web-based application, or using other programmatic or graphical interface techniques) used by the various client systems 620-670 to perform the various digital credential management functionality described herein. In response to receiving inputs from a client system 620-670 corresponding to digital credentials, templates, credential search requests and criteria, etc., the platform server 610 may access the underlying digital credential data store 615 perform the various functionality described herein. In other to perform the tasks described herein, platform server 610 may include components such as network interface controllers 612, processing units 613, and memory 614 configured to store server software, handle authentication and security, and to store, analyze, and manage the digital credentials, templates, and credential tracking data stored within the digital credential data store 615. As shown in this example, the digital credential data store 615 may be implemented as separate dedicated data stores (e.g., databases, file-based storage, etc.) used for storing digital credential template objects, issued digital credentials, credential tracking data, and authorized user/role data. The platform server 610 and data store 615 may be implemented as separate software (and/or storage) components within a single computer server 610 in some examples, while in other examples may be implemented as separate computer servers/systems having separate dedicated processing units, storage devices, and/or network components.

Figure 7:
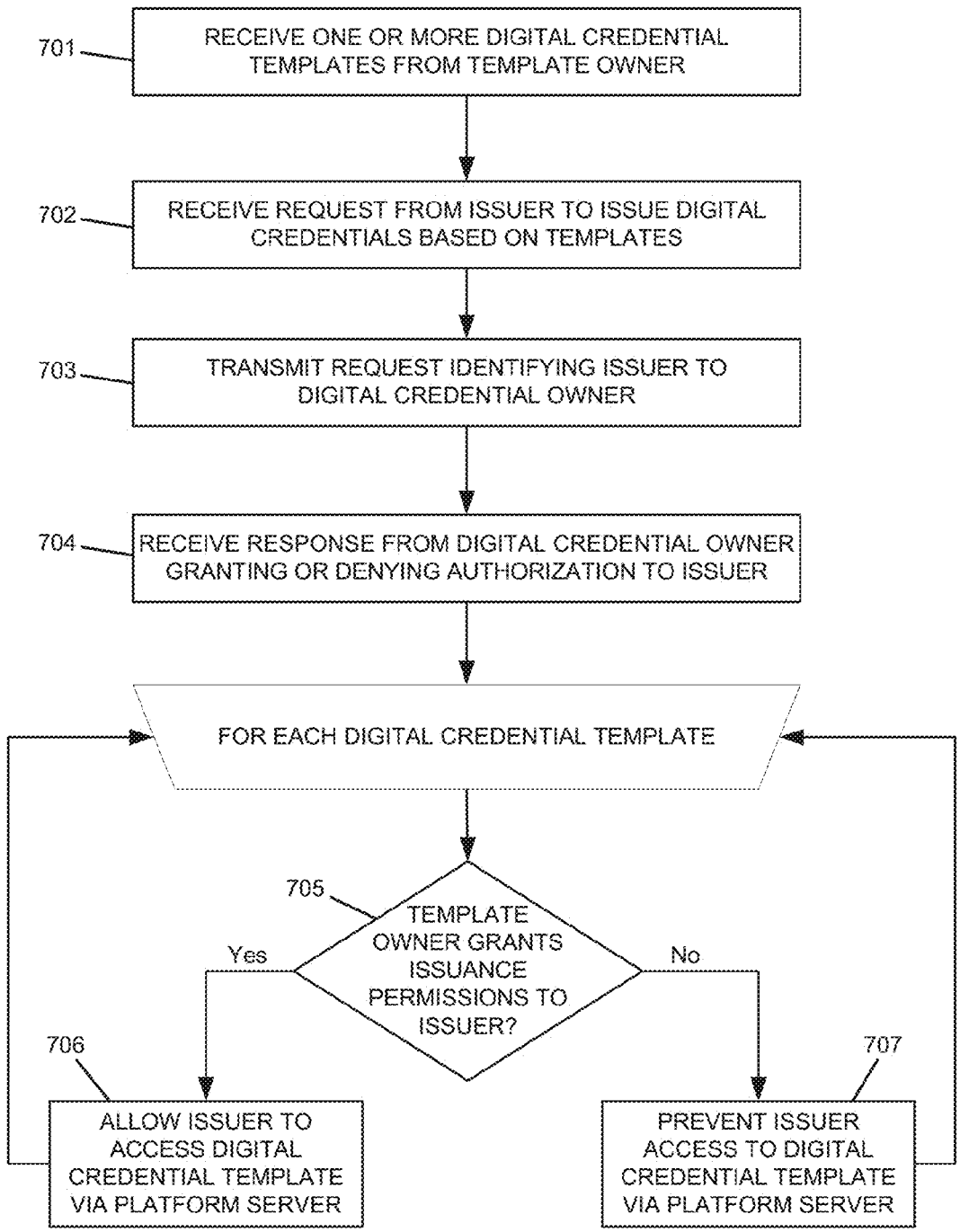
FIG. 7 is a flow diagram illustrating an example process of authorizing digital credential issuers to generate digital credentials based on particular digital credential templates, according to one or more embodiments of the disclosure.

Referring now to FIG. 7, a flow diagram is shown illustrating a process of authorizing digital credential issuers to generate digital credentials based on particular digital credential templates. As described below, the steps in this process may be performed by one or more components in the digital credential management system 600 described above. For example, each of steps 701-707 may be performed by the digital credential platform server 610, in communication with one or more template owner systems 620 and one or more digital credential issuer systems 630. However, in other examples, one or more of the steps in this process may be performed by a template owner system 620 or an issuer system 630. It should also be understood that the various features and processes described herein, including receiving digital credential templates and implementing template-specific access to various authorized issuers, need not be limited to the specific systems and hardware implementations described above in FIGS. 1-6, but also may be performed on the various other systems and hardware implementations described herein.

In step 701, a platform server 610 may receive one or more digital credential templates from one or more template owner systems 620. As discussed above, the digital credential templates received from template owner systems 620 may be an electronic document or data structure storing a general (e.g., non-user specific) description of a specific type of digital credential that may be issued to an individual. Such templates may include a description of the skills, proficiencies, and/or achievements that the digital credential represents, along with the parent organization (i.e., the digital credential template owner) and various additional credential template field/metadata. Although step 701 describes receiving credential templates from a single template owner system 620, the platform server 610 may be configured to receive one or more templates from multiple different template owner systems 620. The received templates may be stored in a credential template repository (e.g., database) within a digital credential data store 615 maintained by the platform server 610. In some embodiments, credential templates may include secure and/or encrypted data, and thus encryption and/or various secure network communication techniques and protocols for transmitting templates from the template owner systems 620 to the platform server 610 in step 701. Such techniques may include, for example, security features and/or specialized hardware (e.g., hardware-accelerated SSL and HTTPS, WS-Security, firewalls, etc.), use of secure data transmission protocols and/or encryption, such as FTP, SFTP, and/or PGP encryption. SSL or TLS protocols, along with HTTP or HTTPS, also may be used to provide secure connections between the template owner systems 620 to the platform server 610, to provide authentication and data security.

In step 702, the platform server 610 may receive a request from an issuer system 630 to be designated an authorized issuer of digital credentials based on one or more of the credential templates stored by platform server 610. In some embodiments, the platform server 610 may provide a graphical user interface through which issuer systems 630 may review and request access to any available templates stored within the platform. Additionally or alternatively, the request in step 702 may be received programmatically (e.g., via API calls) by a service executing on the platform server 610. In either case, the request from the issuer system 630 may specify one or more particular credential templates stored by platform server 610. In some cases, different templates specified in the request may be owned by or associated with different template owners, rather than the issuer system 630 requesting all templates from the same owner. Additionally, the request may specify certain of the templates associated with a particular owner, while not specifying other templates associated with the same owner. Further, although step 702 describes receiving a request from a single issuer system 630, the platform server 610 may be configured to communicate with multiple independent issuer systems 630, each of which may request access to different (or the same) combinations of credential templates from various template owners.

In step 703, the platform server 610 may generate a request to one or more template owner systems 620, based on the request received from the issuer system 630 in step 702. For, example, the platform server 610 may initially identify the template owner systems 620 to be contacted, based on the particular templates specified in the request from the issuer system 630, along with a set of preferred communication techniques defined by each template owner system 620. Such communication techniques may indicate network addresses, protocols, notification types (e.g., email, SMS, service- or application-based, etc.) and the like for communicating requests to the template owner system 620. The platform server 610 may then transmit a properly formatted request to each template owner system 620, indicating the identity of the requesting issuer, and which of the owner's templates the issuer would like permissions to access and issue digital credentials based on.

As noted above, in some cases, multiple requests may be transmitted in step 703 to multiple different template owner systems 620. Each request may include only the credential templates owned by the particular owner system 620, for which the issuer system 630 has requested access. For instance, if the issuer system 630 selected and requested access to six different credential templates in step 702, the platform server 610 may determine in step 703 that the six credential templates are owned by three different templates owners, and may transmit a first request to a first template owner system 620a requesting access to three specific templates on behalf of the issuer, a second request to a second template owner system 620b requesting access to two different specific templates on behalf of the issuer, and a third request to a third template owner system 620c requesting access to one additional specific template on behalf of the issuer.

In step 704, the platform server 610 may receive responses back from one or more template owner systems 620, to the one or more requests sent in step 703. The generation of responses by the template owner systems 620 may be manual (e.g., decided by a template owner administrator) or determined and transmitted automatically based on predetermined criteria for granted requests from issuers. In either cases, the responses received by the platform server 610 may indicate that the template owner system 620 has fully granted the request, partially granted the request (i.e., granted the issuer access to some of the requested templates but not others), or denied the request. Additionally or alternatively, a template owner system 620 may transmit back a request for additional information about the issuer, in which case the platform server 610 may retrieve and transmit the additional requested information back to the template owner system 620, and may then receive a second response from the template owner system 620. In still other cases, the a template owner system 620 may transmit back an alternative proposal, in the form of a different set of templates that the requesting issuer may be granted access, in which case the platform server 610 may relay the alternative proposal back to the issuer system 630 and await a response from the issuer system 630.

In steps 705-707, the platform server 610 may perform an iterative process in which the appropriate authorization data is recorded into the digital credential data store 615, for each credential template for which the issuer system 630 requested access. In step 705, if the template owner has granted access to the issuer, to issue digital credentials based on the template (705:Yes), then in step 706 the platform server 610 may record the updated authorized issuer data in the data store 615. For example, an authorized issuer database, table, or other data repository may be updated to record the association of the requesting issuer with the specific template. On the other hand, if the template owner has not granted access to the issuer, to issue digital credentials based on the template (705:No), then in step 707 the platform server 610 may prevent issuer from accessing the requested template. In some embodiments, the platform server 610 may update a denied template list for each issuer, while in the other embodiments preventing access may be accomplished by sampling not creating a record in the data store 615 affirmatively granting template access to the issuer.

Thus, the techniques described in this example provide support for implementing template-level access to individual digital credential issuers, using the platform server 610 both as a communication intermediary and as a security safeguard to prevent the unauthorized access of credential templates by issuer systems 630. By providing template-level access, owner systems 620 and issuer systems 630 may collaborate to provide the issuer with access to certain specific templates of the owner, while not allowing access the issuer to access other templates of the same owner. Additionally, issuer systems 630 may use a single point of contact (i.e., the platform server 610) to request and receive access to a diversified portfolio of credential templates owned by several different template owners. In various embodiments, issuer systems 630 need not know the specific identities, network addresses, or communication preferences of the corresponding template owner systems 620, and vice versa.

Figure 8:
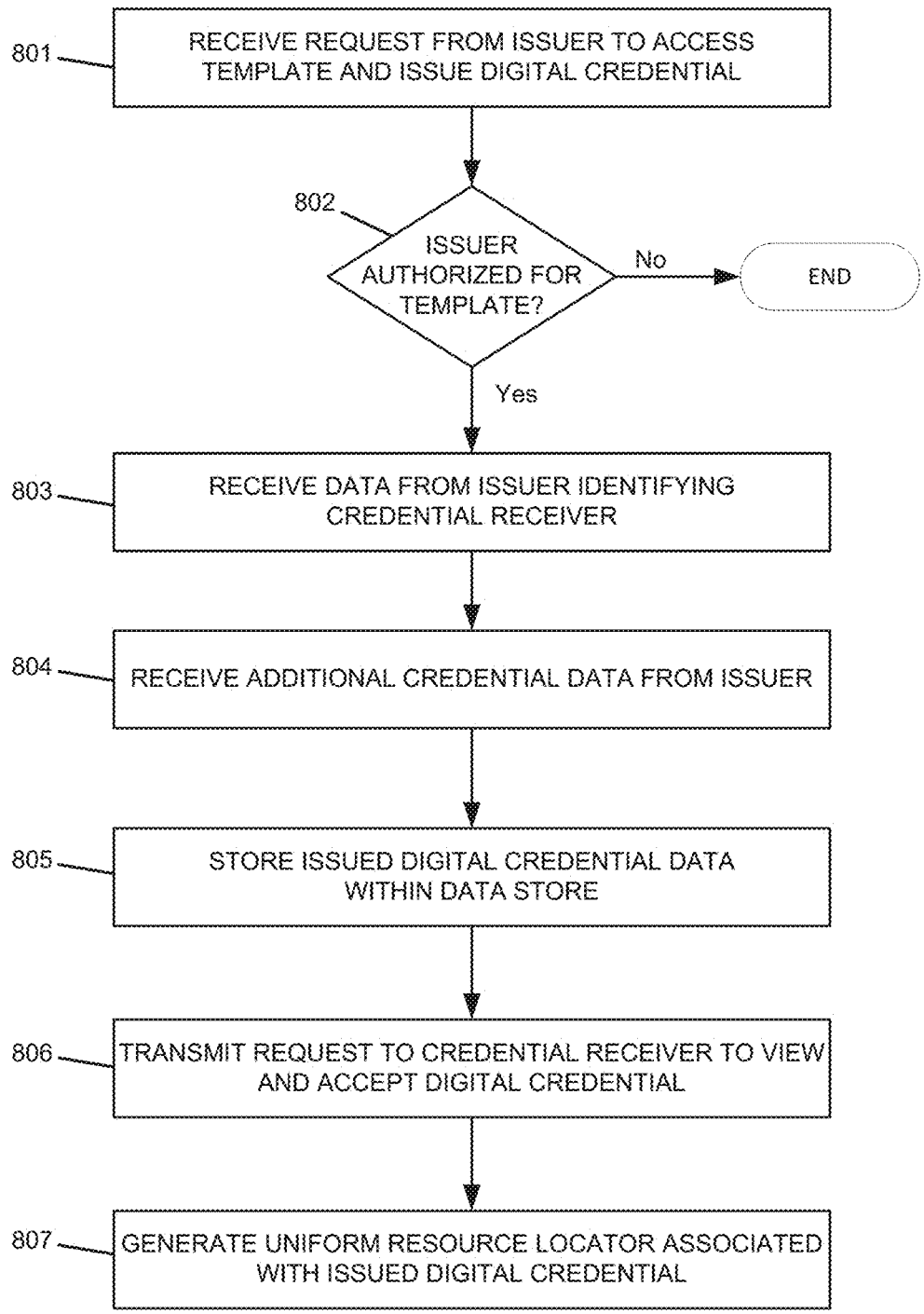
FIG. 8 is a flow diagram illustrating an example process of generating, storing, and provisioning digital credentials based on digital credential templates, according to one or more embodiments of the disclosure.

Referring now to FIG. 8, a flow diagram is shown illustrating a process of generating (or issuing), storing, and provisioning a digital credential based on digital credential template. As discussed above in reference to FIG. 7, the platform server 610 may store and manage the authorization (or lack of authorization) of specific credential issuers to issue digital credentials based on different digital credential templates. In this example process, a credential issuer requests to generate a digital credential based on a particular credential template. Accordingly, the steps in this process may be performed by the digital credential platform server 610, following the steps of FIG. 7, in communication with a digital credential issuer system 630.

In step 801, the platform server 610 may receive a request from a credential issuer system 630 to access a specified credential template in order to generate (or create or issue) a new digital credential. In some embodiments, the platform server 610 may provide a graphical user interface (e.g., web-based) through which issuer systems 630 may issue digital credentials. Additionally or alternatively, the request in step 801 may be received programmatically (e.g., via API calls) by a service executing on the platform server 610. In either case, the request from the issuer system 630 in step 801 may identify at least the issuer making the requesting (e.g., including a username and password and/or other authentication credentials associated with the issue for validation), as well as the specific template for which the issuer is requesting access.

In step 802, the platform server 610 may determine whether or not the issuer making the request is authorized to access the specific template identified in the request. As discussed above, the platform server 610 may maintain updated authorized issuer data in the data store 615, for example, in an authorized issuer database, table, or other data repository. Thus, in step 802, the platform server 610 may retrieve the authorized template data for the issuer, to determine if the issuer is authorized to issue digital credentials based on the specified template. If the issuer is not authorized (802:No), the process ends and no digital credential may be issued.

Assuming the issuer is authorized to issue digital credentials based on the specified template (802:Yes), the issuer may provide data identifying the credential receiver in step 803. The credential receiver (or credential earner or badge earner) corresponds to an individual that has been determined by the issuer to be eligible to receive a digital credential based on the template. For example, the credential receiver may be an individual user of an electronic learning system, professional training system, online certification course, or the like, who has completed a predetermined set of eligibility requirements and/or successfully completed a qualification test to receive a credential in accordance with the template. The receiver identification data received in step 803 may include, for example, the individual's name, contact information (e.g., email address, phone number, etc.) and/or various other identifying data such as a login identifier, system account number, student number, social security number, etc.

In addition to the receiver identification data received in step 803, the issuer system 630 may provide the platform server 610 with additional data necessary (or optional) for generating a digital credential for the credential receiver. The additional data received in step 804 may depend on the credential template, as different templates may include different data fields requiring different information before a digital credential may be issued. Such additional data may include, for example, as issue date for the digital credential, an (optional) expiration date for the digital credential, and/or user-specific evidence which may be embedded or provided as links that provides additional supporting documentation (e.g., transcripts, diplomas, scanned assignments or exam documents, certification letters, reference letters, licenses, identification documents, signed certificates of completion, etc.). The data received in steps 803 and 804 may be transmitted by the issuer system 630 separately or in the same transmission. In some cases, the data may be received in steps 803 and 804 via an interactive graphical user interface provided by the platform server 610. Additionally or alternatively, such data may be received via a programmatic interface (e.g., API calls), or as a network request, or via an invocation of an application or service executing on the platform server, etc.

As noted above, each template owner may designate, for each credential template owned by the owner, one or more digital credential issuers to be authorized issuers of digital credentials based on the template. In such cases, in accordance with the different fields or characteristics of the template document/data structure, template owner may be designated as the credential issuer (e.g., in a first metadata field not editable by the issuer system 630), while the authorized issuer may be designated as the credential provider (e.g., in a second metadata field editable by the issuer system 630). However, for some templates, the template owner may grant access to some (or all) of the authorized issuers of the template to be identified within the digital credential data as the credential issuer. In such cases, any credentials issued based on the template may appear to all credential viewers (e.g., any user requesting/receiving credential data) to be issued solely by the authorized issuer, and the template owner might not be identified in any credential data and/or any user-facing credential graphic views. For instance, based on the document or structure of the credential template, the template owner may remain anonymous to credential earners in some cases, and in other cases the template owner may be listed only as an endorser. The permissions designated from template owners to authorized issuers, to be listed as the credential issuer, may be granted for specific templates and/or for specific template-issuer combinations. For example, a template owner may generate and maintain a first template for which every authorized issuer of the first template is granted permissions to be listed as the credential issuer. However, in other cases, the template owner may, for a particular template, grant permissions for only certain authorized issuers to be listed as the credential issuer, whereas other authorized issuers are not granted these permissions and thus will not be listed as the issuer of digital credentials based on the template.

In addition to granting permissions for certain authorized issuers to be identified as the credential issuer (rather than the credential provider), certain embodiments may provide template owners the ability to grant other types of permissions to authorized issuers as well. For example, a template owner may grant a particular authorized issuer permission to edit an icon image, description, skill set list, and other credential data defined in the template. Similar to the above example, such permissions may be granted by template owners to all authorized issuers of a certain template, or only to some specific authorized issuers of the template. These grants of permission by template owners may be received and enforced by the platform server 610. For example, the platform server 610 may provide various interfaces (e.g., graphical and/or programmatic interfaces) to template owner systems 620 when templates are uploaded from the template owner system 620 to the data store 615. These interfaces also may be accessible to template owner systems 620 at later times, allowing template owners to review and modify to various permissions granted to different authorized issuers.

In step 805, the platform server 610 may issue and store a new digital credential for the credential receiver, based on the data provided by the issuer system 630. In some embodiments, the digital credential may be generated as a new electronic document or data structure instance based on the credential template, after which the user identification data received in step 803, and any additional data received in step 804, may be inserted into the new template instance, thereby customizing the template instance to create the new digital credential with the receiver's user data. The newly issued digital credential may be stored in the digital credential data store 615, for example, in a digital credential database or repository.

In step 806, following a successful issuance of a new digital credential, the platform server 610 may transmit a notification and request to the receiver of the digital credential, allowing the credential earner to accept and/or share the digital credential. In some embodiments, the platform server 610 may use the user contact information received in step 803 (e.g., email address, phone number, etc.) to transmit the notification and request to the appropriate receiver system 640. The process by which a credential earner may respond to the request, by accepting and/or sharing the credential, is discussed in more detail below in reference to FIG. 9.

In step 807, the platform server 610 may provision the new digital credential by generating a unique uniform resource locator (URL) corresponding to the digital credential. The unique URL may reference a valid location within platform server 610 or a separate related web server within the system 600. As discussed in more detail below, the creation and support of a unique URL for each digital credential may allow external users to access and view any digital credential earned by any receiver, and also allows the platform server 610 to record, track, and analyze views the different digital credentials.

In various embodiments, one or both of steps 806 and 807 may be optional, may depend upon one another, and/or may be performed in the opposite order. For instance, in some cases, a new digital credential may be created without transmitting a request to the credential receiver system 640, and also without provisioning the new digital credential. In other cases, one but not the other of these steps may be performed. For example, the platform server 610 may be configured not to provision the new digital credential until after the digital credential has been reviewed and accepted by the credential receiver. In still other cases, an issuer may transmit a particular flag (e.g., an "infrastructure mode" flag) or select a corresponding option when issuing the digital credential, indicating that the credential receiver has not created a platform account or is otherwise unable to access the platform server 610 in order to accept and/or share the new digital credential. When the platform server 610 receives the particular flag or option from the issuer system 630, the server 610 may respond by not transmitting the request to the credential receiver system 640, and instead automatically provisioning the new credential (e.g., generating the unique public URL corresponding to the credential) immediately after the issuance of the credential.

Figure 9:
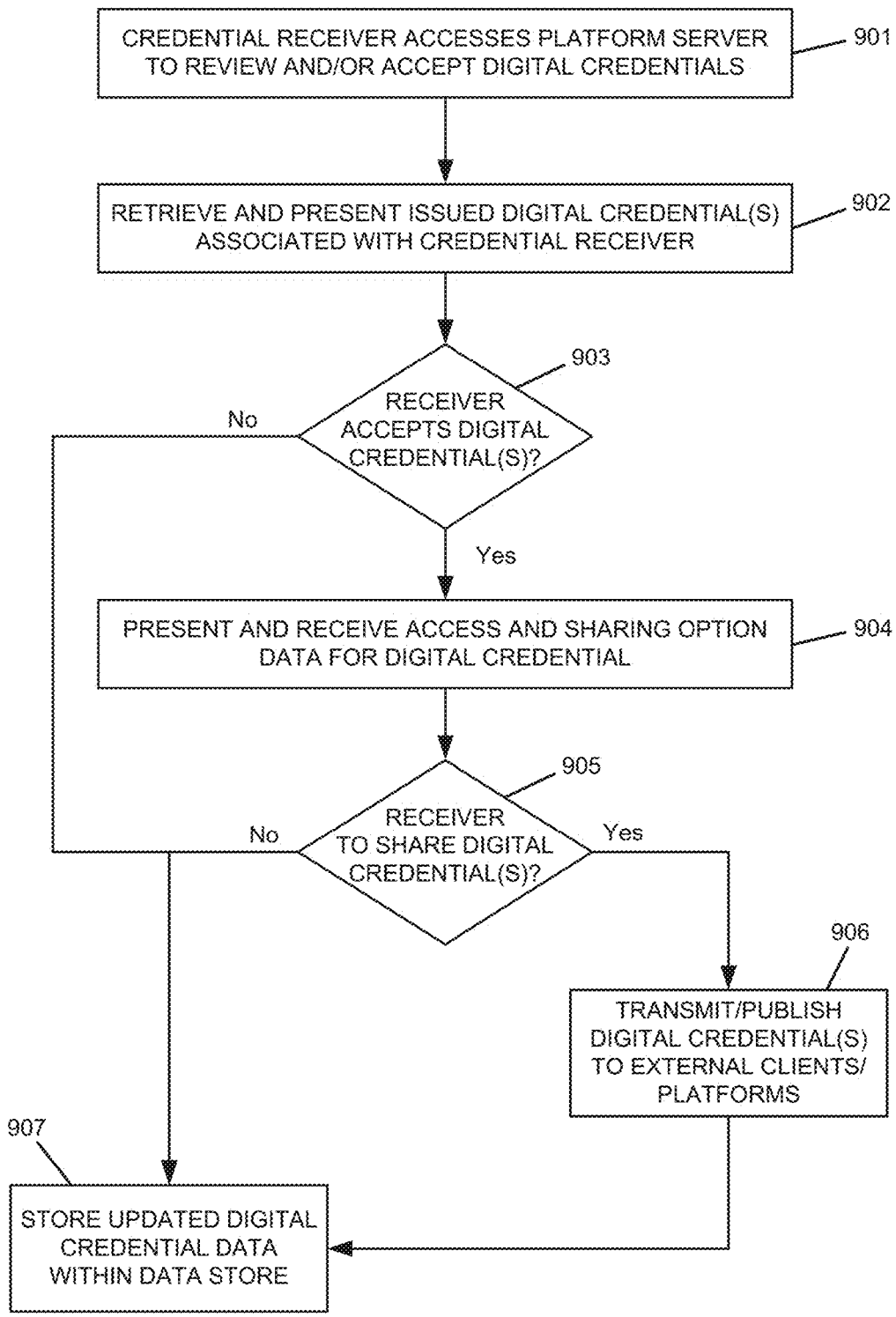
FIG. 9 is a flow diagram illustrating an example process of initiating the acceptance and sharing of digital credentials, based on interactions with digital credential receivers, according to one or more embodiments of the disclosure.

Referring now to FIG. 9, another flow diagram is shown illustrating a process of initiating the acceptance and sharing of digital credentials by a credential receiver (or credential earner). As discussed above in reference to FIG. 8, the platform server 610 may transmit a notification and request to a credential receiver 640 in response to the issuance of a new digital credential for the receiver. In this example process, the credential receiver using system 640 accesses the platform server 610 in order to provide instructions to the platform server 610 with respect to the accepting/rejecting a newly issued credential, and with respect to sharing/not sharing the credential. Accordingly, the steps in this process may be performed by the digital credential platform server 610, following the steps of FIG. 8, in communication with a credential receiver system 640.

In step 901, the platform server 610 receives a request from a credential receiver system 640 to review and/or accept one or more digital credentials issued to the credential receiver (or earner). In some examples, the request in step 901 may be received in response to the transmission sent by the platform server 610 in step 806. The request in step 901, along with the subsequent interactions between the platform server 610 and the credential receiver system 640 in steps 902-906, may be performed via graphical user interface (e.g., web-based) provided by the platform server 610. In such cases, the credential receiver may access and authenticate to the web-based interface, and then may navigate through the various menus of the interface to initiate the acceptance and/or sharing of the receiver's digital credentials.

In step 902, after the credential receiver has been successfully authenticated as the valid receiver, the platform server 610 may retrieve and present data (e.g., via a graphical interface) corresponding to the digital credentials issued to the receiver. In some embodiments, the presentation of digital credentials and/or the restricted interface that allows receivers to accept and/or share digital credentials, may be treated as secure data by the platform server 610. Thus, encryption and/or various secure network communication techniques and protocols may be used for transmitting the digital credentials and/or interface components to the receiver system 640 in step 902. As discussed above, such techniques may include, for example, security features and/or specialized hardware, use of secure data transmission protocols and/or encryption, and the like, to provide authentication and data security.

In step 903, the platform server 610 may receive an indication from the credential receiver whether or the not receiver accepts the issued credential. The indication in step 903 may be received via an interactive graphic interface provided by the platform server 610 to the receiver client device 640, or via a programmatic interface (e.g., API call), a notification (e.g., email or SMS), or any other communication techniques. If the receiver opts not to accept the issued credential (903:No), then the platform server 610 may terminate the communication session with receiver system 640 (or move to the next credential issued to the receiver), and in step 907, may set the status of the digital credential within the data store 615 to indicate that the receiver did not accept the credential.

If the receiver indicates that the issued credential will be accepted (903:Yes), then the platform server 610 may present additional data in step 904 (e.g., via a subsequent menu in the graphical interface) with options to allow the receiver to designate an access level associated with credential (e.g., public or private), and to allow the receiver to share (or publish) the digital credential to various recipients or platforms. Additionally, in some embodiments, the acceptance of a credential by the receiver (903:Yes) also may trigger the platform server 610 to provision the credential, by generating and storing a unique public URL associated with the credential.

Figure 10:
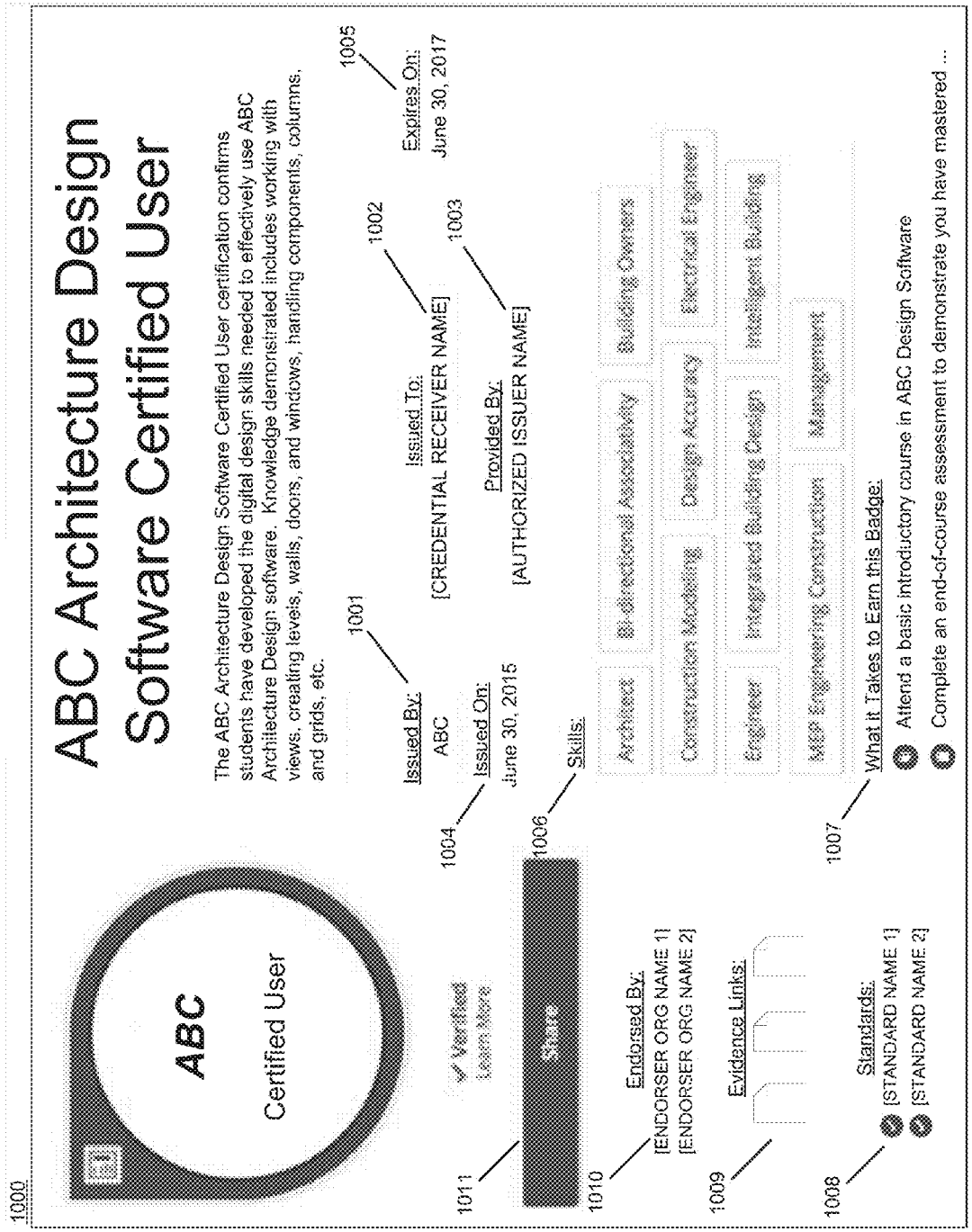
FIG. 10 is an example user interface screen generated by a digital credential platform server to display an issued digital credential, according to one or more embodiments of the disclosure.

Referring briefly to FIG. 10, an example user interface screen is shown displaying a credential view (or badge view) of an issued and accepted digital credential 1000 affirming that the credential receiver is an "ABC Architecture Design Software Certified User." In this example, the digital credential 1000 displays a combination of data from the underlying credential template, such as the credential title, description, icon, skill tags 1006, qualification steps 1007, and standards 1008 associated with the credential template. These fields all may be based on the metadata of the credential template, and in some cases, may be common for all credentials issued based on the template. Additionally, the digital credential 1000 also displays an issuer field 1001, along with data customized to the specific receiver and/or specific issuer during the issuance process, such as the credential receiver name 1002, authorized issuer name 1003, the issue date 1004, and the expiration date 1005, and embedded links 1009 to user-specific documentation supporting the digital credential.

Digital credential 1000 also includes an endorser field with the names of one or more endorsing organizations 1010. A endorsing entity, such as educational institution, business, or technical organization that has chosen to review and endorse a specific digital credential template, may access the platform server 610 via an endorser system 650, in order to confirm an endorsement for a digital credential template. As discussed above, the platform server 610 may allow an endorsing entity or endorsing individual to provide an endorsement for a specific digital credential, while not endorsing other digital credentials based on the same template.

Additionally, digital credential 1000 also includes a sharing button 1011 that allows the credential receiver to share and/or publish the digital credential to one or more individuals and/or platforms. For example, after selecting the sharing button 1011, additional user interface components may be provided to allow the credential earner to email or SMS the digital credential to one or more contacts. Additionally, the credential earner may be provided with options to create a post or to update the earner's user profile within one or more of the earner's social networking applications or platforms.

Returning now to FIG. 9, if the credential receiver opts not to share the digital credential (905:No), then the platform server 610 may terminate the communication session with receiver system 640 (or move to the next credential issued to the receiver), and in step 907, may set the status the digital credential within the data store 615 to indicate that the receiver accepted but did not share the credential. Instead, if the receiver opts to share the digital credential (e.g., via email to certain recipients, or via one or more social networking platforms) (905:Yes), then in step 906 the platform server 610 may provide the appropriate user interface components to allow the user to email or post the digital credential to the receiver's selected sharing/publishing options. In some embodiments, any transmission sharing a digital credential (e.g., emails, posts, profile updates, etc.) may include the unique public URL associated the credential, in order to allow the platform server 610 to receive and track views of the credential (e.g., clicks or access attempts to the unique URL). After the digital credential has been shared/published in step 906 in accordance with the receiver's selections, then in step 907, the platform server 610 may set the status the digital credential within the data store 615 to indicate that the receiver accepted and shared the credential. Additionally, in this case, step 907 may include recording the detailed sharing metrics for the credential in a credential tracking database or repository of the data store 615. The additional detailed sharing metrics stored and tracked by the platform server 610 may include, for example, the time that a digital credential was accepted and/or shared, the geographic location from which a digital credential was accepted and/or shared, the communication network or web domain from which a digital credential was accepted and/or shared, the sharing technique(s) (e.g., email, social networking post, tweet, profile update, etc.), the individual recipients and the social network platform to whom the credential was shared, the web domains and/or business segments of the individual recipients to whom the credential was shared, etc.

In various embodiments, some or all of the above data metrics may be determined by the platform server 610 and stored in the digital credential data store 615 for each instance of an acceptance and/or sharing of a credential. Additionally, when the sharing of a digital credential involves the transmission of the unique public URL associated with the credential, the sharing may result in subsequent views of the credential (e.g., clicks or access attempts to the unique URL). The platform server 610 (and/or related servers) may provide receive requests to view credentials, for example, HTTP requests directed to one or more of the unique public URLs corresponding to a user's credentials, and may respond to the requests with credential information (e.g., a credential/badge view web-based user interface, etc.). In some embodiments, a unique URL corresponding to a digital credential may be directed to a unique network resource supported by the platform server 610. Additionally or alternatively, a unique URL may be directed to a non-unique network resource, but may be unique by virtue of one or more unique URL parameters, and/or may include other unique message header or body data identifying one or more specific digital credentials. Further, as described below in more detail in reference to FIGS. 12-14, views of digital credential, along with the details relating to the view (e.g., time, viewer network address, web domain, geographic location, etc.) also may be stored in the data store 615 for tracking, reporting, and analyzing by the platform server 610.

Figure 11:
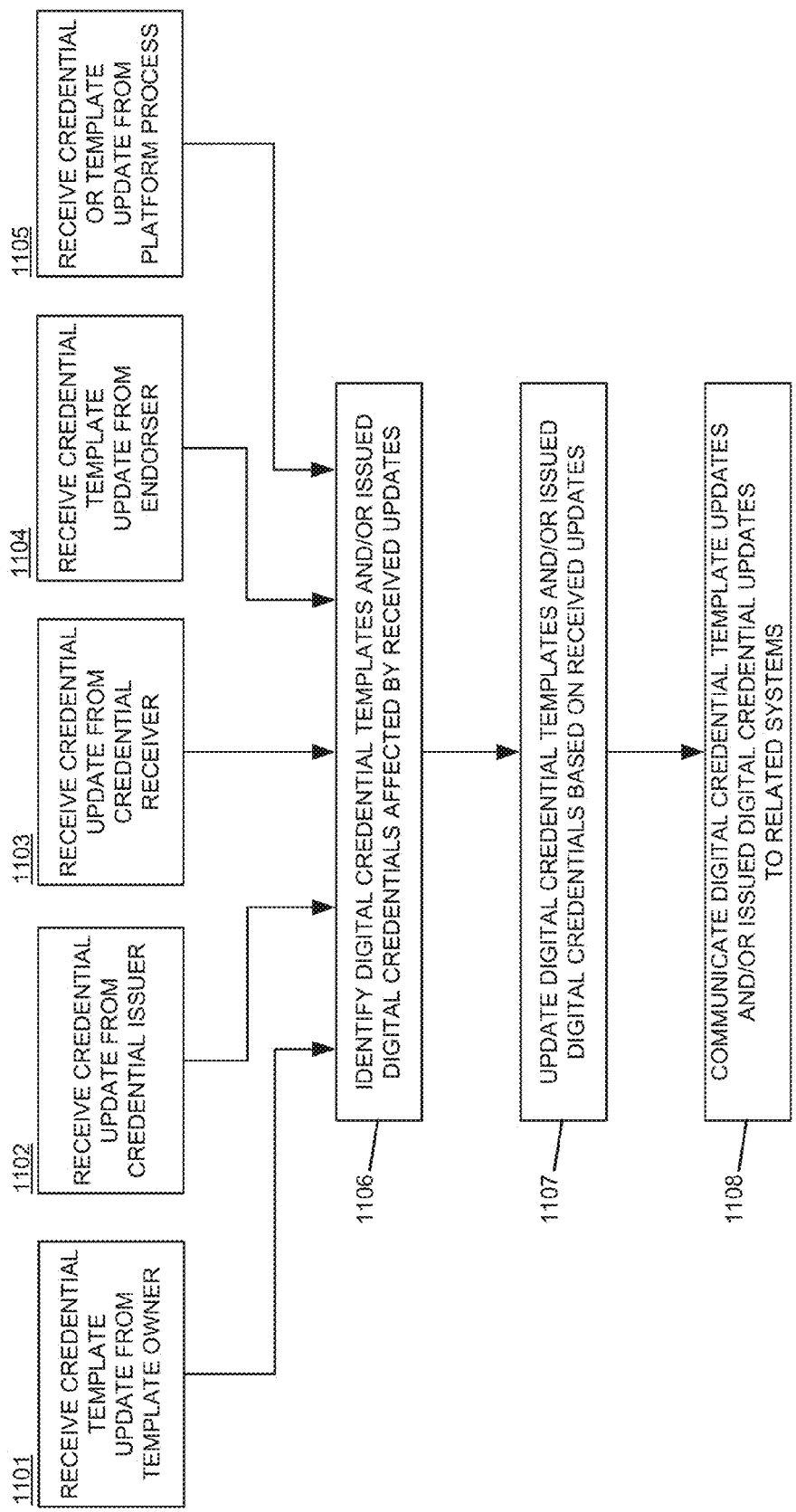
FIG. 11 is a flow diagram illustrating an example process of updating an issued digital credential, based on one or more interactions with a digital credential template owner, issuer, receiver, endorser, or based on an internal process, according to one or more embodiments of the disclosure.

Referring now to FIG. 11, another flow diagram is shown illustrating a process of updating an issued digital credential, based on data received from one or more external systems and/or internal processes. In some embodiments, the components of the digital credential management system 600, individually or in collaboration, may be configured to update the digital credentials stored in the data store 615, even after issuance of the credentials, in order to maintain a current and valid set of digital credentials within the system 600. As discussed below, in such embodiments, several different may occurrences and/or interactions with client system 620-670 may trigger the platform server 610 to update one or more issued digital credentials within the data store 615.

Steps 1101-1105 correspond to different occurrences and/or interactions which may trigger the platform server 610 to update one or more issued digital credentials within the data store 615. In step 1101, the platform server 610 may receive a credential template update from one or more template owners. For instance, a template owner may revise any of the template data (e.g., credential name, description, skills, etc.). A template owner also may revoke or replace a credential template, or may set/update an expiration data associated with a credential template. In step 1102, the platform server 610 may receive a credential update from one or more credential issuers. In some embodiments, an authorized credential issuer also may be authorized to revise or revoke previously-issued credentials. In step 1103, the platform server 610 may receive a credential update from a credential receiver. For example, a credential receiver may return to the interfaces provided to platform server 610 to accept a previously rejected credential, reject a previously accepted credential, or to change the public/private status of a credential, etc. In step 1104, the platform server 610 may receive a credential update from a credential endorser. For instance, an endorsing entity may add a new endorsement to a credential template from which one or more digital credentials have already been issued. Additionally, an endorsing entity may opt to remove a previously endorsed template or credential. Finally, in step 1105, the platform server 610 may receive data from an internal process, for example, a data monitoring/auditing process configured to monitor expiration dates of issued credential and trigger an update or renewal process when an expiration data occurs.

In step 1106, after receiving or determining any update described above in any of steps 1101-1105, the platform server 610 may determine which credential template(s) and/or issued digital credentials will be affected, or at least may be potentially affected, by the received update. For example, if a credential issuer revises or revokes a specific digital credential in step 1102, then only that credential will be affected. However, if a template owner revises or revokes a specific digital credential template in step 1101, then all credentials generated based on the specific template may be affected. As another example, if a credential issuer changes its own name or performs a bulk revision of an issuer-specific data field, then all credentials issued by the issuer (e.g., based on multiple different templates from different template owners) may be affected.

In step 1107, the platform server 610 may update the identified templates and/or digital credentials, based on the updates received in steps 1101-1105. Then, in step 1108, the platform server 610 may initiate communications with one or more related client systems 620-670 to transmit notifications of the updated performed in step 1107. For example, the platform server 610 may transmit a notification to a receiver system 640 to notify the credential receiver that a credential issued to the receiver has been revised or revoked in response to an update from the template owner (step 1101) or credential issuer (step 1102), or based on the expiration of the credential (step 1105). In other examples, similar notifications may be transmitted by the platform server 610 to one or more template owner systems 620, issuer systems 630, endorser systems 650, etc., based on changes to any associated templates or credentials performed in response to updated received from other related entities. Thus, in such embodiments, all systems associated with and/or affected by the status of a particular credential template or issued credential, may be notified by the platform server 610 whenever the particular template or credential is modified based on the actions or processes of another system.

Figure 12:
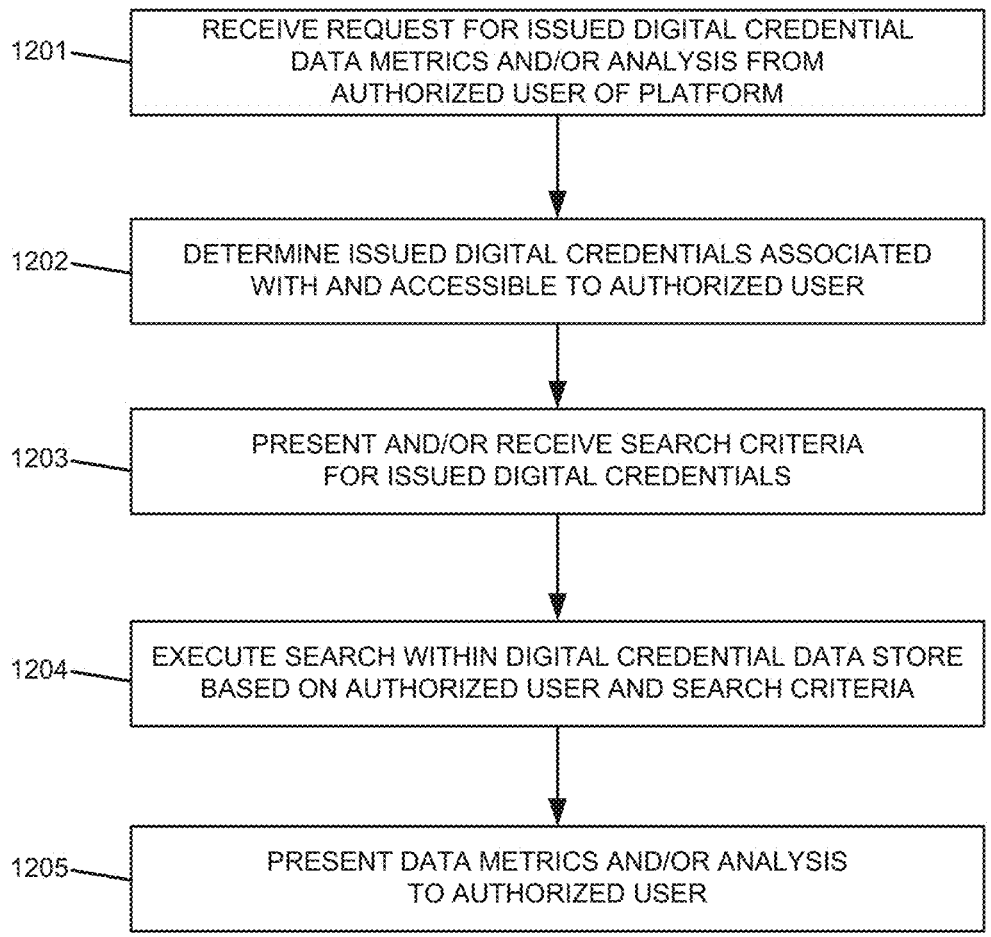
FIG. 12 is a flow diagram illustrating an example process of providing data metrics and/or analysis for a set of digital credentials associated with an authorized user and one or more search criteria, according to one or more embodiments of the disclosure.

Referring now to FIG. 12, another flow diagram is shown illustrating a process of providing data metrics and/or analysis for a set of digital credentials associated with an authorized user and one or more search criteria. As discussed above, the digital credential platform server 610 and/or other components within system 600 may be configured to store, track, analyze, and report data metrics relating to digital credentials. Accordingly, the steps in this process may be performed by the same components within the digital credential management system 600 described above, such as the platform server 610 and/or one or more client systems 620-670. It should also be understood that the various features and processes described herein, including executing queries, searches, and data analysis processes on data stores of digital credentials, need not be limited to the specific systems and hardware implementations described above in FIGS. 1-6, but also may be performed on the various other systems and hardware implementations described herein.

In step 1201, the platform server 610 may receive a request for data metrics and/or analysis relating to a set of issued digital credentials stored in the digital credential data store 615. In request in step 1201 may be received from any of the client systems 620-670 associated with the platform server 610 and credential data store 615. However, as discussed below, the different users requesting data metrics and/or analysis via client systems 620-670 may be authorized to receiving credential reporting and tracking data for different subsets of digital credentials.

Accordingly, in step 1202, the platform server 610 may determine the identity of the authorized user associated with the request in step 1201, and then may determine which of the issued credentials in the data store 615 that authorized user is permitted to access. For example, in some embodiments, a template owner may be permitted to access data relating to only those digital credentials based on one of the template owner's templates. In another example, a credential receiver may be permitted to access data relating to only those digital credentials issued to the receiver. In some embodiments a credential endorser may be permitted to access data relating to only those digital credentials based on a template that has been endorsed by the credential endorser, while in other embodiments, the credential endorser might not be permitted to access even those digital credentials, unless the credential endorser was also the template owner, issuer, or receiver of those digital credentials. In yet another example, a credential issuer may be permitted to access data relating to only those digital credentials issued by the issuer. However, in some embodiments, a credential issuer may be denied access to the reporting data relating to the digital credentials issued by that issuer, unless each template owner specifically allows (e.g., via an interface provided by the platform server 610) the credential issuer to access the data relating to the digital credentials issued by that issuer.

Figure 13A:
FIGS. 13A and 13B are example user interface screens generated by a digital credential platform server to display data metrics and/or analysis for a set of digital credentials, according to one or more embodiments of the disclosure.
Figure 13B:
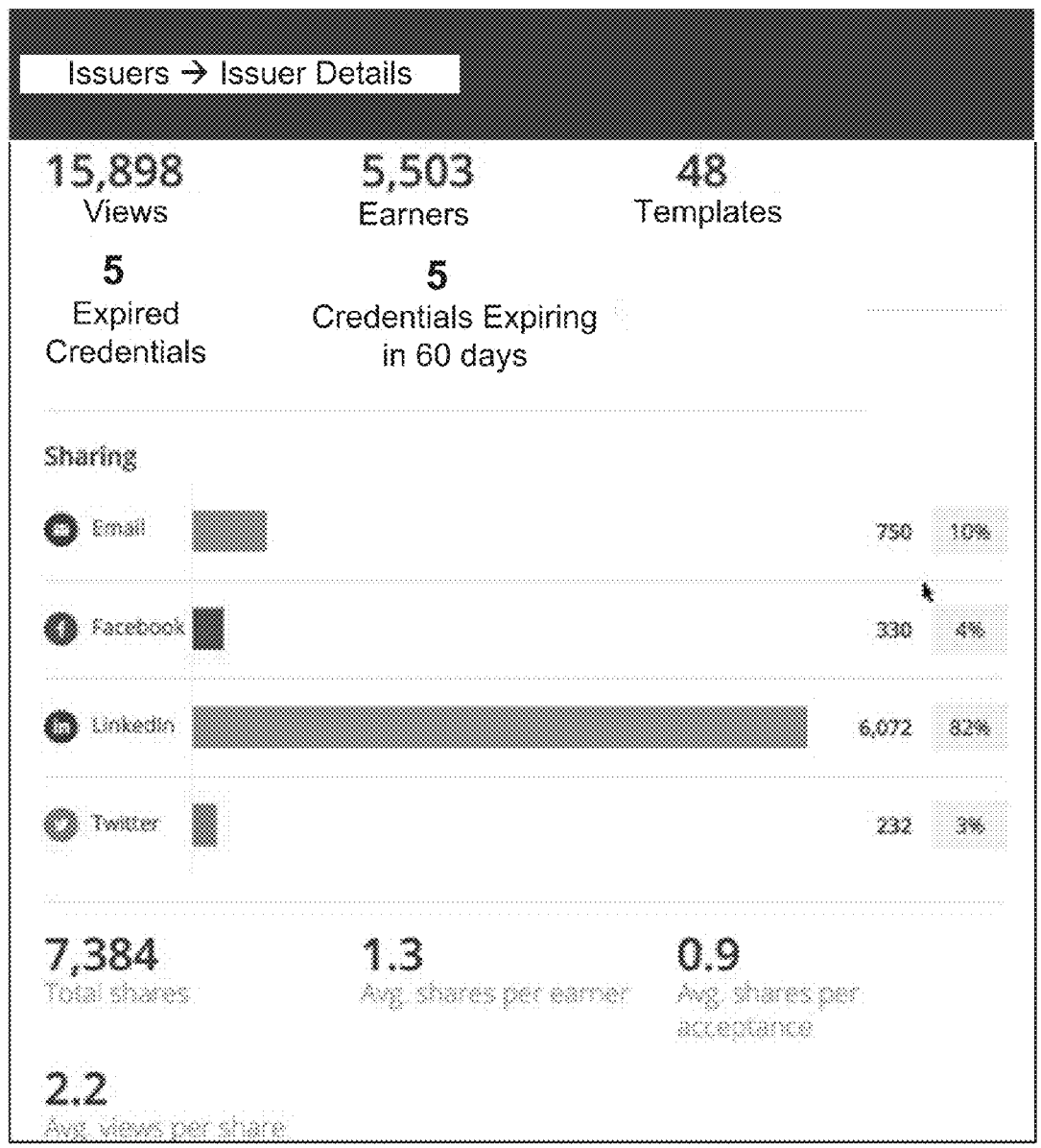

Referring briefly to FIGS. 13A and 13B, two example user interface screens are shown displaying data metrics and analyses for two different sets of digital credentials. In FIG. 13A, a dashboard user interface view is provided for the "Big Data—Administration" credential template. In this example, a client system 620 associated with a template owner has been granted access to the reporting data for the digital credentials based on this particular template. As shown in this example, the platform server 610 has compiled and presented the number and current status of each digital credential issued based on the Big Data—Administration template. The user interface in FIG. 13A also includes an overview of the aggregate number of views of the digital credentials, and the total number of credential earners based on the "Big Data—Administration" template. Similarly, FIG. 13B shows another user interface provided for a specific credential issuer. In this example, a client system 630 associated with a credential issuer has been granted access to the reporting data for the digital credentials issued by the credential issuer. Thus, the credential data presented in FIG. 13B need not be limited to any specific template or template owner, but instead may include credentials based on multiple different templates from different template owners, as long as the credentials were issued by the particular issuer. In this example, the credential data presented in FIG. 13B includes the total number of templates, earners, and views, and shares of digital credentials issued by the issuer. FIG. 13B also includes a sharing chart indicating the total numbers and percentages of credential shares associated with different sharing techniques and/or social network platforms.

Figure 14B:
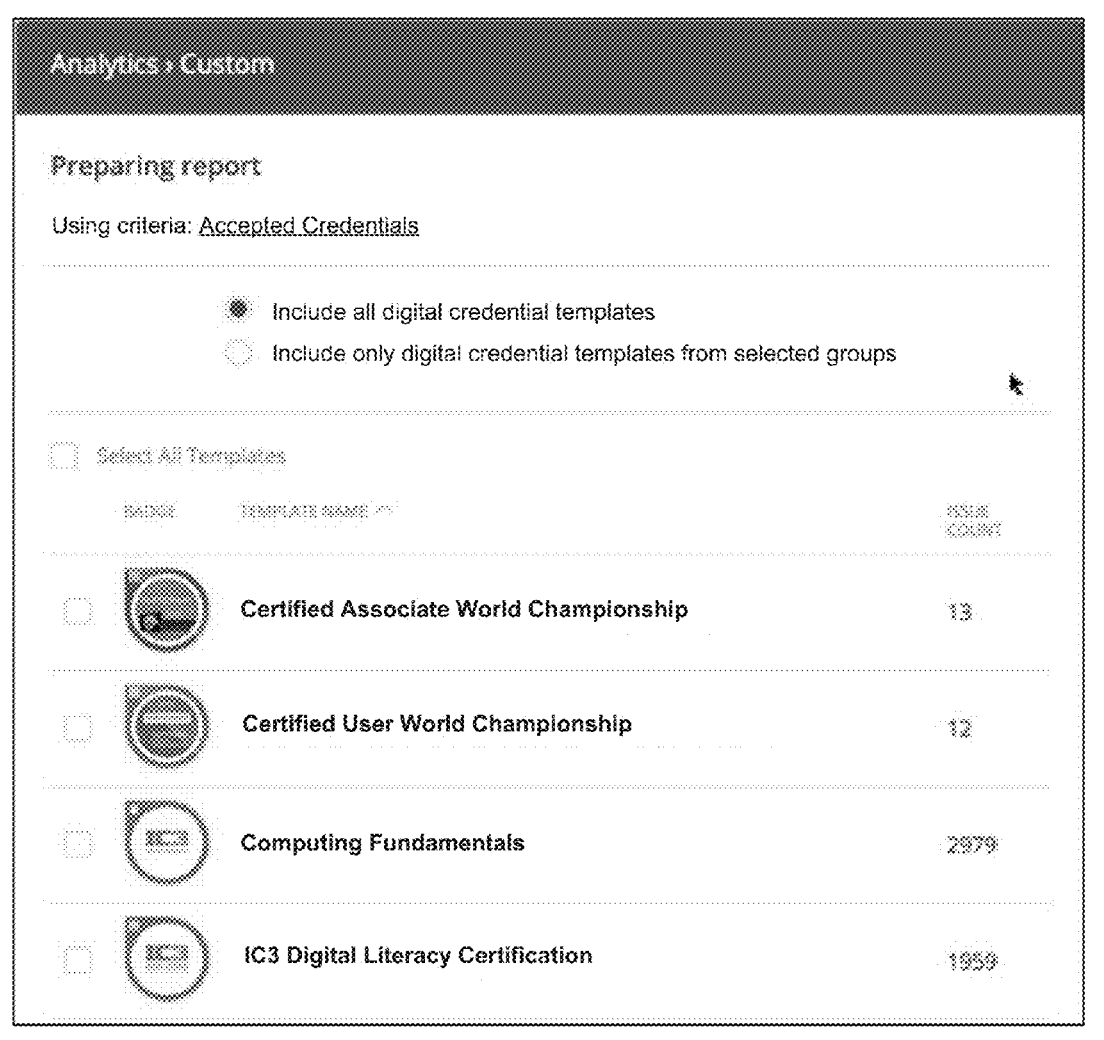

Returning to FIG. 12, in some embodiments, digital credential management system 600 may provide a search interface that allows authorized users to select various search criteria and execute searches on the digital credential data store 615. Accordingly, in step 1203, the platform server 610 may present a search interface and receive a selection of search criteria from the client system 620-670. For example referring briefly to FIGS. 14A and 14B, two example user interface screens are shown displaying a search interface that may be presented to a credential issuer. As shown in FIG. 14A, the credential issuer may search the data store 615 for any of its issued digital credentials, using any combination of a date range criteria, credential state criteria, and expired status criteria. FIG. 14B is a continuation of the search user interface in FIG. 14A. As shown in FIG. 14B, the credential issuer is presented an option to further narrow the search to only a selected set of templates, rather than searching all of the templates for which the credential issuer has issued at least one digital credential.

In step 1204 the platform server 610 may execute a search of the digital credential data store 615, based on the search criteria received from the authorized user in step 1203. In addition to narrowing the returned credential data based on the search criteria, the platform server 610 may further limit the search to the determined set of issued credentials in the data store 615 that authorized user is permitted to access, as determined in step 602. In step 1205, the data metrics and/or analysis retrieved and compiled by the platform server 610, in response to the search executed in step 1204, may be presented to the user, for example, directly via the graphic user interface provided by the platform server 610, or via a data spreadsheet, file transfer, etc.

While FIGS. 13 and 14 provide examples of searching a digital credential data store 615 using only a few basic search criteria (see FIGS. 14A-14B), and then receiving and presenting only a high-level overview of the data metrics such as total issued credentials, views, earners, etc. (see FIGS. 13A-13B), it should be understood that the search criteria received in step 1203 and executed in step 1204 may be based on any stored data associated with a digital credential or template. Similarly, the data metrics and/or analysis retrieved and presented in step 1205 also may include any stored data associated with a digital credential or template. For example, in some embodiments, the permissible search criteria for users may include any data relating to current status of the digital credentials, data relating to the acceptance of the digital credentials (e.g., acceptance time, geographic location and/or web domain associated with the acceptance), the sharing of the digital credentials (e.g., the numbers of shares, timing of shares, the geographical location associated with the sharing event, the specific recipients and/or social media platforms to which the digital credentials were shared, etc.). Additionally, in some embodiments, the search criteria received in step 1203 and/or the data metrics/analysis presented in step 1205 may include data relating to the views of the digital credentials, including but not limited to credential views received from specific different social network sites, credential views received from specific web domains, credential views received from systems associated with specific market segments, and credential views received from specific geographic regions. The search criteria and data metrics also may be based on the times and/or dates associated with credential views. It should be understood that these examples of potential search criteria and data metrics to be retrieved are illustrative only and non-limiting, and that any other data described herein relating to a digital credential or digital credential template, may be used as search criteria and/or presented by the platform server 610 as reporting data metrics.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A digital credential tracking system comprising:
one or more digital credential template owner devices, each digital credential template owner device comprising:
a first processing unit comprising one or more processors;
one or more network interfaces configured to securely transmit data to a digital credential platform server; and
memory coupled with and readable by the first processing unit and storing therein a set of instructions which, when executed by the first processing unit, causes the digital credential template owner device to transmit one or more digital credential templates to the digital credential platform server;
one or more digital credential issuer devices, each digital credential issuer device comprising:
a second processing unit comprising one or more processors;
one or more network interfaces configured to securely transmit data to the digital credential platform server; and
memory coupled with and readable by the second processing unit and storing therein a set of instructions which, when executed by the second processing unit, causes the digital credential issuer device to:
transmit requests to the digital credential platform server to request permission to issue digital credentials based on one or more of the one or more digital credential templates associated with one or more digital credential template owner devices;
access, from the digital credential platform server, a digital credential template for which the digital credential issuer device is authorized to issue digital credentials;
determine one or more credential receivers that are eligible to receive a digital credential based on the one or more digital credential templates;
generate digital credentials based on the one or more digital credential templates and user data associated with the one or more credential receivers; and
transmit data confirming issuance of the generated digital credentials to the digital credential platform server;
one or more credential receiver devices, each credential receiver device comprising:
a third processing unit comprising one or more processors;
one or more network interfaces configured to securely transmit data to the digital credential platform server; and
memory coupled with and readable by the third processing unit and storing therein a set of instructions which, when executed by the third processing unit, causes the credential receiver device to:
receive, from the digital credential platform server, data confirming that one or more digital credentials have been issued to a credential receiver associated with the credential receiver device, by one or more of the one or more digital credential issuer devices; and
transmit, to the digital credential platform server, data indicating one of an acceptance or a rejection of each of the one or more digital credentials; and
the digital credential platform server, comprising:
a fourth processing unit comprising one or more processors;
one or more network interfaces configured to transmit secure data to the one or more digital credential template owner devices, the one or more digital credential issuer devices, and the one or more credential receiver devices; and
memory coupled with and readable by the fourth processing unit and storing therein a set of instructions which, when executed by the fourth processing unit, causes the digital credential platform server to:
receive one or more digital credential templates from one or more of the one or more digital credential template owner devices;
receive data confirming issuance of one or more generated digital credentials, from one or more of the one or more digital credential issuer devices, wherein each generated digital credential is based on one of the one or more digital credential templates, and wherein each generated digital credential is issued to a particular credential receiver;
for each of the one or more generated digital credentials, receive data from one or more of the one or more credential receiver devices indicating either an acceptance or a rejection of the generated digital credential by the particular credential receiver to which the generated digital credential was issued;
for one or more generated digital credentials accepted by the credential receiver:
(a) receive data indicating that the accepted generated digital credential has been shared a first number times by a credential receiver, and store data indicating that the accepted generated digital credential has been shared the first number of times; and
(b) receive data indicating that the accepted generated digital credential has been viewed a second number of times by an external system, and store data indicating that the accepted generated digital credential has been viewed the second number of times;
receive, from a first client device, a request to access a digital credential data store maintained by the digital credential platform server, the request including authorization data for a first authorized user;
determine, in response to the request from the first client device, a first subset of the generated digital credentials associated with the first authorized user; and
transmit, to the first client device in response to the request, data relating to the first subset of the generated digital credentials associated with the first authorized user.

2. The digital credential tracking system of claim 1, wherein the first authorized user is a first credential receiver, and wherein determining the first subset of the generated digital credentials comprises retrieving a set of digital credentials from the digital credential data store issued to the first credential receiver.

3. The digital credential tracking system of claim 1, wherein the first authorized user is a first credential template owner, and wherein determining the first subset of the generated digital credentials comprises retrieving a set of digital credentials from the digital credential data store issued to any credential receiver, by any credential issuer, based on a digital credential template associated with the first credential template owner.

4. The digital credential tracking system of claim 1, wherein the first authorized user is a first credential issuer, and wherein determining the first subset of the generated digital credentials comprises retrieving a set of digital credentials from the digital credential data store issued by the first credential issuer to any credential receiver, based on any digital credential template associated with any credential template owner.

5. The digital credential tracking system of claim 4, the memory of the digital credential platform server storing therein further instructions which, when executed by the fourth processing unit, causes the digital credential platform server to:
receive, from the one or more of the one or more digital credential template owner devices, authorization data permitting the first credential issuer to retrieve data relating to digital credentials issued by the first credential issuer; and
determine, in response to the request from the first client device, that the first credential issuer has been granted access to data relating to digital credentials issued by the first credential issuer.

6. The digital credential tracking system of claim 1, wherein the data transmitted to the first client device relating to the first subset of the generated digital credentials associated with the first authorized user comprises:
data indicating whether or not each generated digital credential has been accepted by a particular credential receiver to which the digital credential was issued;
data corresponding to a number of shares of each generated digital credential accepted by the particular credential receiver to which the digital credential was issued; and
data corresponding to a number of views of each digital credential accepted by the particular credential receiver to which the digital credential was issued.

7. The digital credential tracking system of claim 1, wherein the digital credential data store maintained by the digital credential platform server stores, for the first subset of the generated digital credentials associated with the first authorized user:
data corresponding to a number of views of each digital credential accepted by a credential receiver to which the digital credential was issued, including geographic location data associated with the views of each digital credential.

8. The digital credential tracking system of claim 1, wherein the digital credential data store maintained by the digital credential platform server stores, for the first subset of the generated digital credentials associated with the first authorized user:
data corresponding to a number of shares of each digital credential by a particular credential receiver to which the digital credential was issued, including social media application data associated with the shares of each digital credential.

9. The digital credential tracking system of claim 1, wherein the digital credential data store maintained by the digital credential platform server stores, for the first subset of the generated digital credentials associated with the first authorized user:
geographic location data associated with a credential receiver of each digital credential accepted by a credential receiver to which the digital credential was issued, said geographic location data received during at least one of an acceptance of the digital credential or request to share the digital credential by the credential receiver to which the digital credential was issued.

10. The digital credential tracking system of claim 1, wherein the digital credential data store maintained by the digital credential platform server stores, for the first subset of the generated digital credentials associated with the first authorized user:
data corresponding to a number of views of each digital credential accepted by a credential receiver to which the digital credential was issued, including web domain data associated with the views of each digital credential.

11. A method of tracking digital credentials, comprising:
receiving, by a digital credential platform server, one or more digital credential templates from one or more digital credential template owner devices;
storing the digital credential templates in a digital credential data store maintained by the digital credential platform server;
receiving and storing, by the digital credential platform server, data confirming issuance of one or more generated digital credentials, from one or more digital credential issuer devices, wherein each generated digital credential is based on one of the digital credential templates, and wherein each generated digital credential is issued to a particular credential receiver;
for each of the one or more generated digital credentials, receiving data from one or more credential receiver devices indicating either an acceptance or a rejection of the digital credential by the particular credential receiver to which the digital credential was issued, and storing an indication by the digital credential platform server that the digital credential has either been accepted or rejected by the credential receiver;
for one or more digital credentials accepted by the credential receiver:
(a) receiving data indicating that the accepted digital credential has been shared a first number times by a credential receiver, and storing data within the digital credential platform server indicating that the accepted digital credential has been shared the first number of times; and
(b) receiving data indicating that the accepted digital credential has been viewed a second number of times by an external system, and storing data within the digital credential platform server indicating that the accepted digital credential has been viewed the second number of times;
receiving, by the digital credential platform server, from a first client device, a request to retrieve digital credential data from the digital credential data store maintained by the digital credential platform server, the request including authorization data for a first authorized user;

determining, by the digital credential platform server and in response to the request from the first client device, a first subset of the generated digital credentials associated with the first authorized user; and transmitting, by the digital credential platform server, to the first client device in response to the request, data relating to the first subset of the generated digital credentials associated with the first authorized user.

12. The method of claim 11, wherein the first authorized user is a first credential receiver, and wherein determining the first subset of the generated digital credentials comprises retrieving a set of digital credentials from the digital credential data store issued to the first credential receiver.

13. The method of claim 11, wherein the first authorized user is a first credential template owner, and wherein determining the first subset of the generated digital credentials comprises retrieving a set of digital credentials from the digital credential data store issued to any credential receiver, by any credential issuer, based on a digital credential template associated with the first credential template owner.

14. The method of claim 11, wherein the first authorized user is a first credential issuer, and wherein determining the first subset of the generated digital credentials comprises retrieving a set of digital credentials from the digital credential data store issued by the first credential issuer to any credential receiver, based on any digital credential template associated with any credential template owner.

15. The method of claim 14, further comprising:

receiving, from the one or more of the digital credential template owner devices, authorization data permitting the first credential issuer to retrieve data relating to digital credentials issued by the first credential issuer; and determining, in response to the request from the first client device, that the first credential issuer has been granted access to data relating to digital credentials issued by the first credential issuer.

16. The method of claim 11, wherein the data transmitted to the first client device relating to the first subset of the generated digital credentials associated with the first authorized user comprises:

data indicating whether or not each generated digital credential has been accepted by a particular credential receiver to which the digital credential was issued;

data corresponding to a number of shares of each generated digital credential accepted by the particular credential receiver to which the digital credential was issued; and data corresponding to a number of views of each digital credential accepted by the particular credential receiver to which the digital credential was issued.

17. The method of claim 11, wherein the digital credential data store maintained by the digital credential platform server stores, for the first subset of the generated digital credentials associated with the first authorized user:

data corresponding to a number of views of each digital credential accepted by a credential receiver to which the digital credential was issued, including geographic location data associated with the views of each digital credential.

18. The method of claim 11, wherein the digital credential data store maintained by the digital credential platform server stores, for the first subset of the generated digital credentials associated with the first authorized user:

data corresponding to a number of shares of each digital credential by a particular credential receiver to which the digital credential was issued, including social media application data associated with the shares of each digital credential.

19. The method of claim 11, wherein the digital credential data store maintained by the digital credential platform server stores, for the first subset of the generated digital credentials associated with the first authorized user:

geographic location data associated with a credential receiver of each digital credential accepted by a credential receiver to which the digital credential was issued, said geographic location data received during at least one of an acceptance of the digital credential or a request to share the digital credential, by the credential receiver to which the digital credential was issued.

20. The method of claim 11, wherein the digital credential data store maintained by the digital credential platform server stores, for the first subset of the generated digital credentials associated with the first authorized user:

data corresponding to a number of views of each digital credential accepted by a credential receiver to which the digital credential was issued, including web domain data associated with the views of each digital credential.

* * * * *